US012600895B2

(12) United States Patent　　(10) Patent No.:　US 12,600,895 B2
Hywel-Evans　　(45) Date of Patent:　Apr. 14, 2026

(54) SYSTEM AND METHOD FOR SEALING A WELL USING CONTROLLED HYDRATION EXPANSION OF A SMECTITE-CONTAINING CLAY MINERAL

(71) Applicant: MAC Technology Holdings Co Pty Ltd, West End (AU)

(72) Inventor: Paul Duncan Hywel-Evans, Hornsby (AU)

( * ) Notice: Subject to any disclaimer, the term of this patent is extended or adjusted under 35 U.S.C. 154(b) by 46 days.

(21) Appl. No.: 17/796,650

(22) PCT Filed: Feb. 1, 2021

(86) PCT No.: PCT/IB2021/000042
§ 371 (c)(1),
(2) Date: Jul. 30, 2022

(87) PCT Pub. No.: WO2021/152395
PCT Pub. Date: Aug. 5, 2021

(65) Prior Publication Data
US 2023/0058242 A1　　Feb. 23, 2023

Related U.S. Application Data

(60) Provisional application No. 62/968,934, filed on Jan. 31, 2020.

(51) Int. Cl.
C09K 8/46　　(2006.01)
C04B 28/00　　(2006.01)
(Continued)

(52) U.S. Cl.
CPC .............. C09K 8/46 (2013.01); C04B 28/001 (2013.01); C04B 28/04 (2013.01); C04B 28/065 (2013.01); C09K 8/426 (2013.01); E21B 33/13 (2013.01)

(58) Field of Classification Search
CPC ........ C09K 8/46; C09K 8/426; C04B 28/001; C04B 28/04; C04B 28/065; E21B 33/13
See application file for complete search history.

(56) References Cited

U.S. PATENT DOCUMENTS 6,488,089 B1　12/2002　Bour et al.
2003/0173092 A1*　9/2003　Wilson ................. E21B 33/134
166/387

FOREIGN PATENT DOCUMENTS

CN　102249642 A　*　11/2011　............. C04B 14/10
WO　2002029204 A1　4/2002
(Continued)

OTHER PUBLICATIONS

Prabhakar, A, et al., "Enhancing the Gel Transition Time and Right-Angle-Set Property of Oil Well Cement Slurries by Incorporating CSA Cement and Gypsum", International Petroleum Technology Conference, Beijing, China, Mar. 22, 2019.
(Continued)

*Primary Examiner* — Crystal J Lee
(74) *Attorney, Agent, or Firm* — Morriss O'Bryant Compagni Cannon, PLLC

(57) ABSTRACT

A method of controlled hydration expansion of a smectite-containing day mineral (SCM) within an aqueous environment in a confined volumetric space, the method comprising the steps of: —introducing an amount of an SCM into said volumetric space via an inlet thereinto, and initiating the hydration expansion of the SCM to release SCM particles into the confined volumetric space, and increase the pressure therein; and—introducing a flow path modification to control said released SCM particles from undergoing a recompression, said modification thereby maintaining the pressure in the volumetric space.

26 Claims, 17 Drawing Sheets

(51) Int. Cl.
     *C04B 28/04*          (2006.01)
     *C04B 28/06*          (2006.01)
     *C09K 8/42*           (2006.01)
     *E21B 33/13*          (2006.01)

(56)                    References Cited

FOREIGN PATENT DOCUMENTS

WO          2009092999  A1      7/2009
WO          2015032484  A1      3/2015

OTHER PUBLICATIONS

M. Khalifeh and A. Saasen, "Introduction to Permanent Plug and
Abandonment of Wells," Ocean Engineering & Oceanograpy 12,
Chapter 4, published on-line, Jan. 28, 2020, p. 8.

* cited by examiner

Colloid

Thixotrope

Gap size = Electrostatic Repulsion – Van der Waals attraction

Unaligned plates

Plates aligned with the restraint

Restraint

Unaligned plates

FIGURE 27 - TABLE 1 – DETAILS OF THE GROUT

| Grout component | Grout component introduces specific phases or functional groups | Grout component functional group hydration products |
|---|---|---|
| Ordinary Portland Cement (OPC) | Alite or Tricalcium silicate $Ca_3O_5Si$ (abbreviated to $C_3S$) | $C_3S$ hydrates to calcium silicate hydrate ($Ca_2H_2O_5Si$, aka C-S-H) |
| | Dicalcium silicate $Ca_2SiO_4$ (abbreviated to $C_2S$) | $C_2S$ gives a hydration product of calcium hydroxide ($Ca(OH)_2$) (abbreviated to CH) aka hydrated lime, or Portlandite. |
| | Tri-calcium aluminate ($3CaO$ $Al_2O_3$) ($C_3A$) and | $C_3A$ gives a hydration product of aluminate and hydroxyl ions |
| | Tetra-calcium aluminoferrite ($4CaO$ $Al_2O_3Fe_2O_3$) ($C_4AF$) in water produce aluminate and hydroxyl ions | $C_4AF$ gives a hydration product of aluminate and hydroxyl ions |
| | gypsum (calcium sulfate dihydrate, or $Ca$ $SO_4.2H_2O$) | In water the gypsum partially dissolves releasing calcium and sulfate ions to react with the aluminate. |
| Calcium sulfo aluminate (CSA) cement | Belite or Dicalcium silicate, $Ca_2SiO_4$ (abbreviated to $C_2S$), | $C_2S$ gives a hydration product of calcium hydroxide ($Ca(OH)_2$) (abbreviated to CH), aka hydrated lime, or Portlandite. |
| | gypsum (calcium sulfate dihydrate, or $Ca$ $SO_4.2H_2O$); and | In water the gypsum partially dissolves releasing calcium and sulfate ions to react with the aluminate. |
| | tetra calcium trialuminate sulfate $Ca_4(AlO_2)_6SO_3$ source of aluminate, sulfate and calcium ions | CSA cement hydrates so that the aluminate, sulfate, calcium and hydroxyl ions can reform as calcium trisulfo aluminate hydrate ettringite, (AFt phase) which in the presence of lime is expansive in nature $3CaO \bullet Al_2O_3 \bullet 3$ $CaSO_4 \bullet 32$ $H_2O$ or $C_3A \bullet 3$ $CaSO_4 \bullet 32$ $H_2O$ <br><br> or as calcium sulfo aluminate hydrate monosulfate, (AFm phase) $CaO \bullet Al_2O_3 \bullet CaSO_4 \bullet 12$ $H_2O$ or $C_3A \bullet CaSO_4 \bullet 12$ $H_2O$ |

SYSTEM AND METHOD FOR SEALING A WELL USING CONTROLLED HYDRATION EXPANSION OF A SMECTITE-CONTAINING CLAY MINERAL

TECHNICAL FIELD

This disclosure relates generally to a system and method for sealing a well located in the ground, in order to shut down the use of that well, and in particular this method is aimed at hydrocarbon extraction wells, used in the oil and gas industry.

While the present disclosure is mainly concerned with a system and method for this purpose, it can also be applied to sealing of other types of holes in the ground, or instead for provision of sealing of underground pipework and other subterranean structures.

BACKGROUND TO THE DISCLOSURE

Drilling holes into the earth provides access to precious commodities such as water and hydrocarbons such as oil and gas. The safe exploitation of hydrocarbon reserves is reliant on the integrity of petroleum wells to protect the environment from uncontrolled flows of hydrocarbons. For example, in a conventional underground reservoir, an accumulation of hydrocarbon gas can only be accessed by penetrating the overlying strata by use of an elongate, cylindrical, metallic-walled production well to allow the gas to be recovered, and the well casing typically is affixed in position within the surrounding strata using a cement slurry.

The down hole environment (temperature, pressure, formation water chemistry) will govern the design of the cement slurry and impact on the performance across the full lifecycle of a well. Also, the density and rheological properties will determine the success of the initial placement of the cement. During the operational life of the well, variations in temperature and pressure will occur, and the behaviour of the set cement material (due to the curing temperature and pressure) and thereafter changes in the material response (stiffness, ductility etc) owing to changes in temperature and applied stresses, including fatigue degradation due to loading cycles will all play a role. Portland cements are known to have the potential to degrade in aggressive chemical environments, the down hole chemistry and its interaction with the cement sheath is therefore of paramount importance in ensuring integrity of a well is maintained long after the well has been decommissioned.

Having created a drilled hole into the ground strata for whatever purpose desired, there will become a time when the well needs to be abandoned, decommissioned and the site remediated. Current practice in hydrocarbon well abandonment over the last century is based on the in-situ hydration and setting of Portland cement to form a solid mechanical plug within the well casing, with an exemplary plug shown in FIG. 1. The process is simply the placement of a cement slurry into the well casing which, upon hydration, sets hard to form a mechanical plug which permanently occludes the well. Plugging and abandonment is an essential part of reserve exploitation, and incurs significant costs.

Physical Failure

FIG. 1 shows examples of typical leakage pathways for fluids to pass up into aquifers, or up to the ground surface, via a co-annular (double-walled) well casing positioned in the surrounding ground, those pathways including: (1) between the cement and the outside of the well casing; (2) between cement and the inside of casing; (3) through the cement which is located circumferentially around the exterior of the wall casing; (4) through the well casing itself; (5) in fractures within the cement itself; and (6) between cement and rock.

FIG. 2 shows a further example of leakage pathways for fluids to pass up into aquifers, or up to the ground surface, via a single-walled well casing including: (1) through the cement itself which is located circumferentially around the exterior of the well casing; (2) along the interface between the cement and the exterior of the well casing; (3) along the interface between the cement sealing plug and the interior of the well casing (4) through cracks or fissures in the cement plug itself; (5) between the cement which is located circumferentially around the exterior of the well casing and the interface which that cement has with the surrounding rock strata; (6) via a fault in the rock strata which leads to the interface between the cement and the exterior of the well casing; (7) along and through a fault in the well casing itself; and (8) via the physical dislodgment of the plug which caps the well casing.

Well Abandonment Sealing Techniques

There are effectively four main abandonment techniques, each of which attempts to place a sealing substance permanently within the well to occlude the casing, and to render impossible the upward vertical movement of any material or gas within the well. In all methods, the most commonly used substance for this purpose is Portland cement, which is a hydraulic binder which, upon hydration follows a known reaction pathway to form a solid material within the well bore.

The four main abandonment techniques have somewhat different methods of delivering cement to a location within the well bore to result in a localised mechanical barrier, such that fluids cannot migrate anymore from one stratum to another via the well bore. Those four methods of cement delivery are: (a) the balanced plug method, (b) the cement squeeze method, (c) the dump bailer method and (d) the two plug method. Each involves some sort of delivery system to position the necessary amount of cement or other binding substance at a suitable location down in the well without undue intermixing with the slurry in the pipe, which would otherwise lead to contamination, and potentially compromise the resulting well plug. In some cases, the cement is combined with the use of a mechanical wellbore barrier element (downhole object such as bridging plug or a cement retainer).

For a cement plug to be considered a barrier, it needs to be verified, for example by a positive pressure test and/or negative pressure test (in the column of fluids located above the plug). Such a test can only be applied after the recommended waiting on cement (WOC) time to allow the cement to develop sufficient compressive strength/shear bond first. However, the success rate for the placement of plugs is low, at typically only around every 1 in 2, or every 1 in 3 attempts. This means that achieving a satisfactory well abandonment procedure will take several attempts before the well can be considered closed, suggesting a saving in time can be achieved if a more robust system is employed.

Nature of the Cement Itself

Oil-well cements are used for cementing work in the drilling of oil wells where they are subject to high temperatures and pressures. They usually consist of Portland or pozzolanic cement, with special organic retarders to prevent the cement from setting too quickly.

There are many types of Portland cement available, depending upon the end use application and chemical environment. Specific properties are required for abandonment cement plugs such as: rapid compressive strength development, low permeability of the set cement, adequate fluid-loss control if set in open hole (or if squeezed) and no sedimentation. Oil well cement plugs fail for many reasons, and prevent the contents of the well from continuing to leak out into the surrounding strata, some sort of self-healing ability would be required. Portland cement is incapable of self-healing as the hydration mechanism, once started reduces in activity as the more reactive phases are consumed and the hydration atmosphere impedes the dissolution of what is left.

Portland cement is made up of four main compounds: tricalcium silicate ($3CaO\ SiO_2$), dicalcium silicate ($2CaO\ SiO_2$), tricalcium aluminate ($3CaO\ Al_2O_3$), and a tetracalcium aluminoferrite ($4CaO\ Al_2O_3Fe_2O_3$). In an abbreviated notation differing from the normal atomic symbols, compounds are designated as $C_3S$, $C_2S$, $C_3A$, and $C_4AF$.

The most important hydraulic constituents are the calcium silicates, $C_2S$ and $C_3S$. Upon mixing with water, the calcium silicates react with water molecules to form calcium silicate hydrate ($3CaO\ 2SiO_2\cdot3H_2O$) and calcium hydroxide ($Ca[OH]_2$). The $C_3S$ is mainly responsible for the strength developed in the first week of hardening and the $C_2S$ for the subsequent increase in strength.

Set cement and concrete can suffer deterioration from attack by some natural or artificial chemical agents. The alumina component is vulnerable to chemical attack in soils containing sulfate salts or in seawater, while the iron compound and the two calcium silicates are more resistant. Calcium hydroxide released during the hydration of the calcium silicates is also vulnerable to attack. Because cement liberates heat when it hydrates, concrete placed in large masses, as in dams, can cause the temperature inside the mass to rise as much as 40° C. (70° F.) above the outside temperature. Subsequent cooling can be a cause of cracking. The highest heat of hydration is shown by $C_3A$, followed in descending order by $C_3S$, $C_4AF$, and $C_2S$.

Regulatory Controls

Cement plugs are by far the most common plugging materials seen in oil well abandonment, and they suffer from many different failure modes. Due to poor abandonment practices in the past, there are many examples of abandoned, open Coal Seam Gas (CSG) wells. If the CSG well is abandoned without sealing, contamination of the area around the well can occur together with the potential for contamination of any overlying aquifers which the well passes through. Possible ground water pollution by escaping well contents could impact heavily on the livelihood of surrounding communities, sometimes rendering the potable water supply unfit for consumption.

In most cases, governments have now legislated preventing improper abandonment, and for operators the cost of decommissioning is a substantial part of the overall resource recovery investment. Unfortunately, the well sealing technology available is imperfect and could cause similar failures in the future.

There remains a need for a system and method for efficiently plugging hydrocarbon wells which is less susceptible to the physical deterioration or chemical degradation which is experienced by well plugs made of Portland cement. In particular, it would be advantageous if a more effective alternative could be found to capping hydrocarbon wells than using Portland cement, since reducing the number of well failures can reduce the overall operational cost of repeating the capping procedure multiple times, and increase the level of safety for the workers attending to this task, along with possible operating cost reductions.

Any new kind of well abandonment methodology ought to be practical and cost effective, along with the aims of being permanent and environmentally and ecologically compatible with modern standards. In particular, it would be advantageous if such a sealing system could overcome any water contamination issues mentioned (such as not allowing cross contamination between different strata) and protect groundwater aquifers.

SUMMARY OF THE DISCLOSURE

Clay minerals are very common in soils, in fine-grained sedimentary rocks such as shale, mudstone, and siltstone and in fine-grained metamorphic slate and phyllite. For example, bentonite is a natural sedimentary deposit and is benign to the environment. It is the raw naturally occurring form which contains the mineral montmorillonite, and a number of other materials including sand, depending on the source of the bentonite.

Smectite is the name used for a group of phyllosilicate clay mineral species, the most important minerals of which are montmorillonite, beidellite, nontronite, saponite and hectorite. These clay minerals have a general physical morphology comprising series of parallel sheets made up of platelets. Montmorillonite is the most common smectite mineral in bentonite, and gives bentonite much of its useful properties, Bentonite is widely used in many different industries, some of which exploit its swelling characteristics when bentonite is allowed to absorb water. It is often referred to as "swelling clay", which is a generalisation, visualised as the expansion of a material when introduced to water. In this context, the term "swelling" means the visual, qualitative volume increase of a material relative to other materials that are present around it. FIG. 3 depicts some particular swelling clays of interest which have water absorption properties, and which comprise the phyllosilicate mineral as a major contributor to the swelling behaviour of the clay.

First division 1:1 phyllosilicate clays, for example kaolinite, are made up of particles in the shape of flat plates where only one side of the plate is a silicate layer. If the silicate layer is the one to which water molecules are drawn by electrostatic attraction, then there is at least one layer of water acquired per sheet.

Second division, 2:1 phyllosilicate clays are made up of particles in the shape of flat plates where both sides of the plate are a silicate layer, each one to draw water molecules thereto by electrostatic attraction. One way of considering the expansion of clays is to consider the ability of the plates to attract a single or multiple contiguous water layers. When this is applied to phyllosilicates, the behaviour of the clay can be predicted.

Hydration can now be generally considered to be the accumulation of intercrystalline water between individual clay plates. As anhydrous clays undergo hydration on exposure to moisture, they all, except for certain pure chlorites, show some sort of dimensional increase. The result of intercrystalline water accumulation is that clays which have unblocked tetrahedral silicate layers will acquire water from the environment, which is attracted to the plate surface. In so doing, the volume of the "clay" effectively increases.

In a first aspect, embodiments are disclosed of a method of controlled hydration expansion of a smectite-containing clay mineral (SCM) within an aqueous environment in a confined volumetric space, the method comprising the steps of:

introducing a body, which includes an amount of an SCM, into said volumetric space via an inlet thereinto;

controlling the rate of release of SCM particles from the body by controlling hydration expansion conditions in the aqueous environment, to increase the rate at which said released SCM particles move between a first condition of being in close facing proximity to one another and a second condition of being spaced away from one another, wherein movement towards said second condition results in a relative change in pressure in the confined volumetric space; and introducing a flow path modification to limit the extent to which said released SCM particles are able to revert from the second condition to the first condition, and by such a limitation, to maintain the changed pressure in said volumetric space.

In some embodiments of the method, the overall relative change in the pressure in the volumetric space is an increase in pressure, associated with the expansion of the spatial distribution of the SCM particles, and as the volumetric space becomes filled.

In some embodiments of the method, the SCM comprises montmorillonite. In particular embodiments, the SCM comprises bentonite. In some embodiments, the SCM is initially present in a compressed form. Montmorillonite is an exemplary member of the smectite group of minerals, and readily demonstrates expansive properties during hydration. However, it is understood that the scope of the disclosure extends to other members of the smectite group of minerals which have a similar morphology insofar as they function as a swellable clays in contact with water.

The clay minerals being used in industry are derived from naturally occurring igneous deposits, they contain a range of other impurities and other non or low expansivity minerals. The general name for the naturally deposited material bearing montmorillonite, and containing these contaminants, is bentonite. The present inventor made use of raw bentonite, and for the purposes of this specification the term "bentonite" will be used as the general identifier, unless specific mechanistic explanations related to the montmorillonite plates are being discussed, in these cases montmorillonite will be specifically used.

Montmorillonite already at least one layer of water over the montmorillonite plate surfaces, but as the material acquires water between the plates during hydration it will expand with significant force. This short distance initial swelling should not be confused with the term free swelling. Free swell is the ability of the unrestrained clay to form a colloid (IS: 2720 (Part 40) 1977), the bentonite industry and most of the associated industries consuming the clay require that the bentonite should either form a colloid to act as a thixotrope, or fail to expand and clump together as in cat litter. In this context, the term "free swell" refers to the unrestrained dispersion of the plates to form a colloid.

As it moves from a "colloidal" formation state to short range 4-40 Å plate separation, this is referred to herein as an "intercrystalline" swelling state. This short-range swelling is associated with generating considerable expansive force. At a particulate level, montmorillonite is made up of "particles" (sometimes referred to as crystals) where the word "particle" is defined herein to include plate-shaped/plates/platelets/plate-like/sheets which have an average diameter of 10,000 Angstroms (around 1 μm) but are only 9.6 Angstroms average diameter thickness (0.96 nm) thick so they resemble vast sheets of paper and occur in randomly orientated stacks which expand apart usefully to about 37 Angstroms (37 nm).

In some embodiments, the step of controlling hydration expansion conditions in the aqueous environment occurs simultaneously with the introduction of the body into the confined volumetric space. For example, a body in the form of a downhole plug assembly can deliver the SCM to a particular location depth in a groundwell, and the plug can have a compartment for carrying and release of other chemical substances and water. In some embodiments the compartment can contain 80% v/v or more by volume of water, required to drive the hydration expansion of the SCM. In yet other embodiments, a downhole plug can be separately lowered to deliver the SCM, in a dry or semi-dry physical state, to a particular location depth in the well, immediately followed by the step of pumping a pre-determined quantity of a slurry mixture of chemical substances and water into the well, in order to drive the hydration expansion of the SCM.

In some embodiments, the step of introducing a flow path modification occurs simultaneously with the step of controlling hydration expansion conditions in the aqueous environment, so that in some cases the system for delivering the SCM (for example, via a downhole plug to a particular depth location in the well) is the same system which simultaneously delivers the chemical or the physical item which functions to provide flow path modification. In alternative arrangements, a downhole plug can be lowered to deliver the SCM, in a dry or semi-dry physical state, to a particular location depth in the well, but then the step of pumping a pre-determined quantity of a slurry mixture of chemical substances and water into the well can be delayed or timed to coincide with the same activity in a number of wells in a field.

At a structural level, the individual crystals/particles of montmorillonite clay are not tightly bound hence water can intervene, causing the clay to swell. The water content of montmorillonite is variable, and it increases greatly in volume when it absorbs water. Sodium bentonite expands when wet, absorbing as much as several times its dry mass in water. The plates are non-contiguous and actively draw water into the inter-plate gap. The most accepted theory is that this is the osmotic attraction of water molecules to the counter ions present in the inter-plate gap causing swelling. If the driving force for the accumulation of the water is sufficiently high to overcome any environmental restraining pressure, the clay expands.

Because of its excellent colloidal properties, bentonite is often used in drilling mud for oil and gas wells and boreholes for geotechnical and environmental investigations. The property of swelling can also make sodium bentonite useful as a sealant, since it provides a self-sealing, low permeability barrier. As the swelling effect is controlled by the structure of the mineral being discussed, a mineral with parallel plates, which attracts water, will have to move the plates apart to accommodate that water.

Montmorillonite is hydrated sodium calcium aluminium magnesium silicate hydroxide $(Na,Ca)0.33(Al,Mg)2$ $(Si4O10)(OH)2 \cdot nH2O$. The substitution of magnesium for aluminium and iron in the octahedral layer leaves a net negative charge imbalance which attracts cation counter ions to the plate surfaces. Potassium, sodium, lithium and calcium and other cations are common substitutes, and the exact ratio of cations depends on the prevalence of the ions in the current groundwater around the deposit.

Bentonite has been extensively studied for a range of applications including as a colloidal thickening or sealing agent. The bentonite used in the present experimental work was taken from the Gurulmundi mine near Miles, Queensland, Australia. The clay is saturated at the surface of the platelets with sodium ions, and present as a soft greasy rock which is easily cut. The mineral montmorillonite occurs as a series of very thin plates constructed from a sandwich of two tetrahedral silicate sheets and a central octahedral sheet of alumina. It is believed that it is the hydration of these ions which drives the accumulation of a hydraulic atmosphere and in so doing, pushes the plates apart giving an apparent expansion of the solid material.

The range of different alkali metal doped montmorillonites available theoretically adds two more substantial complications to the sealing of wells. In water wells where the ratio of depth to diameter can be very low, bentonite is added in its powdered or granular form. The bentonite forms a colloidal matrix and acts as a water impervious sealing layer when drawn through sand.

In some embodiments, the step of controlling the hydration expansion conditions in the aqueous environment involves the use of one or more introduced chemical substances which are arranged to react with one or more ionic materials in solution in said aqueous environment to form a solid product, thereby reducing the ionic strength in the aqueous environment and, consequentially, increasing the rate of release/detachment/separation of SCM particles from the body.

In some embodiments, the introduced chemical substance is an amount of each member of the group comprising: Ordinary Portland Cement (OPC); Calcium sulfoaluminate cement (CSA).

In such embodiments, the blend of each introduced chemical substance takes two types of cement which are not known in combination for use in downhole plugging applications, such as plugging oil and gas wells, for example. Depending on the properties of plugs required in the particular well field, in some embodiments, the blend may comprise any of the following composition combinations:

more than 10% w/w of CSA and less than 80% w/w of OPC; alternatively of more than 20% w/w of CSA and less than 70% w/w of OPC; alternatively of more than 30% w/w of CSA and less than 60% w/w of OPC; alternatively of more than 40% w/w of CSA and less than 50% w/w of OPC; alternatively of more than 50% w/w of CSA and less than 40% w/w of OPC; alternatively of more than 60% w/w of CSA and less than 30% w/w of OPC; alternatively of more than 70% w/w of CSA and less than 20% w/w of OPC;

and in the or each case, the balance of 10% w/w of each composition is made up of additional reactive ionic material (such as: sulfates); and other cement setting agents (such as: retardants or accelerants) to adjust the speed of hydration formation.

In an alternative embodiment, the introduced chemical substances can comprise an amount of each of the compounds in each of Group A and Group B, where such Groups comprise the following:

Group A Alite or Tricalcium silicate $Ca_3O_5Si$ ($C_3S$);

Belite or Dicalcium silicate $Ca_2SiO_4$ ($C_2S$);

Tri-calcium aluminate ($3CaO\ Al_2O_3$) ($C_3A$);

Tetra-calcium aluminoferrite ($4CaO\ Al_2O_3Fe_2O_3$) ($C_4AF$); and

Group B Belite or Dicalcium silicate $Ca_2SiO_4$ ($C_2S$);

gypsum (calcium sulfate n-hydrate, or $Ca\ SO_4 \cdot n\text{-}H_2O$);

tetra calcium trialuminate sulfate $Ca_4(AlO_2)_6SO_3$.

In effect, this alternative embodiment allows a user to make blend variations to the usual mineralogy of the principal constituents of OPC (as shown for Group A) and of CSA (as shown for Group B).

In some embodiments, when a slurry of chemical substances is prepared ready to add into the confined volumetric space, for example a drill hole for plugging, the slurry is pre-mixed for pumping into the drill hole, either at the same time or shortly after the body containing the amount of SCM has been placed in the drill hole at the predetermined plug location. In some examples, the slurry is blended with a ratio of about 2.5 to 1.0, being the total weight of water relative to the total weight of all the introduced chemical substances which are to be added to the well, in order to effect the controlled hydration expansion of the SCM plug.

In one particular form, the solid product formed from the use of the or each introduced chemical substance forms a gel, in use which provides retention of the spatial separation of SCM particles in the second condition. In some particular forms of this, the solid product has a crystalline structure. In some circumstances, the solid product comprises at least one of an AFm or an AFt phase calcium sulfoaluminate hydrate.

AFm and AFt phases are groups of minerals that occur in hydrated cement. One of the most common AFm phases in hydrated cement is monosulfate, but the most common AFt phase is ettringite. Ettringite is an AFt phase because it contains three (t-tri) molecules of anhydrite when written as $C_3A \cdot 3\ CaSO_4 \cdot 32\ H_2O$ and monosulfate is an AFm phase because it contains one (m-mono) molecule of anhydrite when written as $C_3A \cdot 3\ CaSO_4 \cdot 12\ H_2O$ Ettringite appears as rod-like crystals in the early stages of reaction or sometimes as massive growths filling pores or cracks in mature concrete or mortar. Monosulfate tends to occur in the later stages of cement hydration, a day or two after mixing. It is noted that both ettringite and monosulfate are compounds of $C_3A$, CaSO4 (anhydrite) and water, in different proportions.

In some embodiments, ettringite provides retention of the spatial separation of hydrated particles of SCM when moved into the second condition, the ettringite being formed in situ in the aqueous environment by creating:

(i) a mixture of aluminate, sulfate, and calcium ions produced from the hydration of CSA cement;

which, in the presence of:

(ii) alkali (calcium hydroxide, ($Ca(OH)_2$)), produced from the hydration of dicalcium silicate $Ca_2SiO_4$; ($C_2S$) which is present in Portland cement (OPC), and in CSA cement, reacts to form:

calcium trisulfoaluminate hydrate, $3CaO \cdot Al2O3 \cdot 3$ $CaSO4 \cdot 32\ H2O$, being ettringite, which is expansive in nature.

Typically, ettringite grows very quickly and produces long, thin crystals, which can be up to 2 to 4 micrometers in cross-section, and 20 to 30 micrometers in length. In forming its crystalline hydrate structure, the ettringite is withdrawing most of the dissolved ions from the solution which, in turn, increases the rate at which the SCM particles are released from the body, and move toward the hydrated second condition in which they are spaced away from one another. Since ettringite is an expansive crystalline substance which occupies roughly twice the volume of the original compounds, the result of its formation is a controlled expansion within the vicinity of those crystals. In the present CSA-OPC system, 85% of the ettringite is developed at a very early stage in the process (typically in just a few hours or a day), and well before the aluminates and silicates in the OPC-CSA cements start to hydrate.

In some embodiments of the method, with the passage of time, the flow path modification which applies initially to limit the extent to which the released SCM particles can revert from the second condition to the first condition, is replaced by a second flow path modification. This is because the initial formation of the crystalline hydrate structure of the ettringite can be considered to be an equilibrium reaction state, and at some point, when the alkalinity in the aqueous environment in contact with the ettringite starts to increase, the ettringite can become chemically unstable.

In some embodiments, formation of ettringite ceases when all of the sulfate ions, and some of the calcium ions from the mixture of step (i) are consumed. In some embodiments, when the already-formed ettringite subsequently becomes unstable, it firstly converts to calcium mono-sulfoaluminate hydrate (AFm phase) $CaO \cdot Al_2O_3 \cdot CaSO_4 \cdot 12$ $H_2O$ or $C_3A \cdot CaSO_4 \cdot 12$ $H_2O$, and then eventually there is complete dissolution to release calcium, sulfate and aluminate ions.

In some embodiments, the second flow path modification involves the use of one or more further introduced chemical substances (being either those already present in the substances added initially, or formed in-situ as a result of reactions occurring within the structure of the hydratable cement) to form a gel, which in use provides retention of the spatial separation of SCM particles in the second condition, and to secure the expansion pressure within the confined volume.

In some forms of this, the gel or solid product has a crystalline structure. In some particular forms of this, the solid product is a hydrate of an aluminate-rich cement, for example the solid product is Strätlingite.

In some embodiments, the Strätlingite $Ca_2Al_2(SiO_2)$ $(OH)_{10} \cdot 2.5(H_2O)$, which provides retention of the spatial separation of hydrated particles of SCM when moved into the second condition, is formed in situ in the aqueous environment as follows:

(i) about 7-15 days after the hydration of the SCM commences, an increase occurs in the rate of hydration of dicalcium silicate $Ca_2SiO_4$; ($C_2S$) which is present in both Portland cement, and in CSA cement;

(ii) this results in the formation of an alkali (calcium hydroxide, ($Ca(OH)_2$)), and silicate ions in solution; and in addition is combined with (iii) a mixture of aluminate, sulfate, and calcium ions are produced from the dissolution of the ettringite.

In the present case, the $C_2S$ reacts with the water in the confined space to form Stratlingite, which is a hydration product found in some rapid-setting cements which can provide high compressive strength in a short time. The Strätlingite crystals therefore can provide superior binding properties which make it more suitable for the current physical application of producing a hydrocarbon well plug, in comparison with the typical Portland cement.

Furthermore, Strätlingite can also elevate the pH of the system to a level at which the bentonite is caused to expand just a little more and to counteract the tendency of the ions which ultimately enter into the solution in the confined volumetric space, which otherwise can have the net effect of reducing the swelling of the bentonite.

In some embodiments, the SCM particles are plate-like in shape, each of the major faces arranged in close facing proximity to a major face of another SCM particle, prior to hydration expansion.

In some embodiments of the method, as the first SCM particles within the confined volumetric space become hydrated, they will move away from the hydrating body (for example, a bentonite well plug) and towards an inner wall of the volumetric space (such as the interior wall of the ground well), to form a zone of plate-like particles at that wall, unless the particles are limited from doing so by the flow path modification.

In some embodiments of the method, the body is in the form of a cylinder having an external circumferential diameter which is narrower than the diameter of the confined volumetric space, and of the inlet thereto, in use the method of controlled hydration expansion is preceded by the step of sliding the body through said inlet to a pre-determined location in said volumetric space, for example down into the depths of an oil and gas well which needs to be plug sealed.

In some embodiments, the body comprises a compressed core of SCM which experiences said controlled expansion conditions until said compressed core is at least partially consumed to a point of equilibrium in its expansion, whereupon an unconsumed remainder of said core provides the basis for future controlled hydration expansion as required. The advantage of placing a compressed core of an SCM into, for example, an elongate tube or well bore, is that it will slide into position more smoothly, due to the smooth external surface such a body, and the hydraulic initiation of the swelling of the SCM can be somewhat delayed.

In some embodiments, the confined volumetric space is defined by the annular space between an interior cylindrical wall of an underground well bore and an external cylindrical surface of the compressed core. This volumetric area is the space into which the SCM (such as bentonite) can expand into, meeting the inner dimension of the pipe tube of an oil and gas well, for example.

In some embodiments, there is an excess amount of bentonite (pre-determined by calculation to remain available in-situ) which has remained unswollen, located within the hydration-expanded and cement crystal-reinforced well plug which has been formed by the various reactions which have cause the swelling of the remainder of the bentonite.

In some embodiments, the calculations made about the quantity of the bentonite, as well as the quantities of the other reagents which produce ettringite and Strätlingite, will firstly depend firstly on the quality of bentonite that is being used. Different bentonites can have:

different water absorption capacity (sodium bentonite clay can expand by swelling from 10-30 times its dry volume when fully exposed to water);

different time needed to hydrate-if the water is too "hard", or if the pH is not in the range of 8.5 to 9.5, then the bentonite will take longer to hydrate, or might not fully hydrate at all; and different expansion properties.

An expansion pathway can be constructed by modifying the hydrating environment of the bentonite cylinder in-situ down in the well. If the chemical substances added could be used to modify the hydration pathway over time, then potentially the hydration of the selected bentonite may be directed to provide the best possible outcome. In some embodiments, the or each introduced chemical substance is a cementitious substance, and in one particular form, the or each cementitious substance can be found in the specialised grout product ref 9CBD1 which is available from Pop Innovations Pty Limited of Brisbane, Australia, which was used to modify the hydration pathway of the bentonite as a whole.

The present inventor noted that various regulations and working practices exist which detail the specific use of bentonite for waterwell abandonment and sealing. By comparison, most modern oil and gas wells are abandoned using the cement sealing methods and cements of various types, as discussed earlier in the Background section of this specification. The applicability of bentonite (as a representative example of a smectite-containing mineral) for use in sealing of oil and gas wells has now been demonstrated in this experimental study.

Although the abandonment of water wells and boreholes has been successfully achieved using bentonite, this has not been the case in hydrocarbon or coal seam gas (CSG) wells before. One reason for this is due to the difference between the length to diameter ratio of the traditional water well compared with that of CSG. CSG wells may also have a number of angled deviations in direction, for example having a vertical bore with at least one diversion to a non-vertical bore. In the deeper CSG type wells, the bentonite must be added in a form which allows the bentonite to get to the bottom of the well before it starts swelling and not form bridging structures, blocking the well at a premature depth.

To achieve a successful seal placement, a swellable clay mineral has to be able to be introduced in a physical form which both allows it to reach a desired placement point in the well casing, and to withstand the mechanical attrition of placing it in that position. For example, the bentonite may need to be located at a great depth, and to be plunged at speed into a body of water in order to get to that depth. The bentonite then needs to be able to be deployed so as to then swell and expand to fill (or block) the cross-sectional area of the well, to create a plug seal in its own right.

To achieve this, firstly a high expansivity bentonite is formed by compression into a cylinder of material with a small enough diameter to allow its passage down into a selected depth in the production well casing, where it can then be deployed as a well-plugging seal. In some embodiments the swelling clay seal can be passed through a vertical or deviated CSG well in a controlled manner, and then ultimately deployed such that the well is permanently closed.

For successful sealing of economically depleted coal seam gas (CSG) wells another consideration is that the CSG well, even though depleted, can generate significant pressure over time by residual gas migration. The second fundamental consideration is the physical geometry of the CSG well. This geometry can mean that the bentonite application method used in water wells is not directly applicable at the depths of CSG wells. Also, due to their depth, several aquifers lying above the coal bearing strata may have been penetrated as the CSG well was constructed. In attempting to permanently remediate the depleted well, it is desirable that the whole well is blocked in a controlled manner, so that there is no possibility of co-mingling of fluids and gases from the coal seam with any permeable strata above or aquifers.

Once the bentonite has been introduced into the well it will hydrate, expanding to fill the well creating a seal. It appears from this work that a combination of all plate separation phases, both intercrystalline and colloidal swelling, will have an effect on the plate separation swelling pressures.

This proposed use of bentonites as a sealing method produces further complications in that many CSG wells do not contain potable water, rather the water contains considerable concentrations of solutes. These solutes can potentially ion exchange with the alkali metals on the surface of the montmorillonite and also disrupt the hydration atmosphere and cause the bentonite to lose water of hydration and hence it's associated expansive force. It was thought possible that the plugs exposed to these conditions may become so reduced in diameter that contaminant liquids may pass the plug, leading to a failure of the bentonite seal.

Due to its general availability, sodium montmorillonite was selected as the raw material for manufacture of the bentonite plugs. For simplicity, sodium ions will be used in all further discussions, however it must be remembered that calcium, lithium, sodium and potassium ions can be interchanged in discussions of intercrystalline expansion mechanisms. Regardless of which bentonite is selected, a predictive model of the expansive forces generated by the montmorillonite contained within the raw bentonite deposit has been developed, so as to predict the potential for sealing of CSG wells.

In an alternative embodiment to the aforementioned method of using the addition of certain chemical substances to create a flow path modification circumstance, the step of controlling the hydration expansion conditions in the aqueous environment can involve the introduction of a flow path modification in the form of a physical barrier which limits the extent to which said SCM particles are able to revert from the second condition to the first condition, and by such a limitation, to maintain the changed pressure in said volumetric space.

In some embodiments of this, the physical barrier disrupts the released, hydrated SCM particles (in the "intercrystalline" state) from reforming into said first condition in which the particles are arranged in close facing proximity to one other—in other words, preventing them reforming into a compressed state, also known as the "colloidal" state, in which some of those plate-like montmorillonite particles reform into a layered morphology).

In some embodiments the barrier could be made of pliable and water permeable materials, for example a compressed mat of wool insulation, wrapped around the surface of the plug prior to being placed into the well, would generate a fibrous matrix through which the colloid plates cannot travel. In so doing the colloidal phase will be inhibited from leaving the intercrystalline matrix. Likewise, other physical barriers may be applied, such as paper, cellulose, keratin, any soft long polymer etc so long as it is a long fibre and is in contact with other fibres making something that acts like a net. It is the control of the platelets of montmorillonite that is common to all.

Advantages of the Disclosed System and Method

The inventor has developed a system and method for plugging an oil and gas well, involving the delivery of a smectite-containing mineral (SCM) along with various other necessary reagents into the well, whereupon hydration of these substances occurs in a specific sequence resulting in at least some beneficial features and outcomes. The potential result is permanent plugging and abandonment of hydrocarbon well bores—in one illustrative example using a plug featuring the use of geological deposit bentonite (an ore containing smectite mineral) to produce a stable, expansive plug seal.

Other novel aspects of embodiments of the materials and the system disclosed include:

The SCM prior to hydration is compressed into a solid form, which is of a tapered torpedo-like cylindrical shape which is able to go down a tortuous well, and amount of SCM is predetermined by calculation based on the dimensions of the volumetric space;

This means that the confined volumetric space as defined can be the interior volume inside a drilling well casing, or even the interior volume of the well bore;

Making a modification of the natural hydration process of an SCM, so as to limit the tendency of hydrated, released SCM particles to revert to a first condition of being in close facing proximity to one another, as a colloid with plate alignment occurring at the casing-plug wall interface; and Delivering bentonite in a capsule or other containment vessel so that it can be inserted to reach any depth within an oil and gas well, including reaching the bottom of such a well.

Some novel properties of the swellable plug used in this system include:

there is a means to delay the final expansion swelling of bentonite;

the final expansion swelling of the bentonite is dynamic and can be continuously adapted to the conditions by having a portion of the plug which is dormant; and the plug has an internal means to overcome the problem of alignment of the plate-like particles of bentonite gathering at the circumferential edges of the plug, and so the difficulties normally presented to a finished well plug of a low friction shear plane and side edge wall channel formation has been ameliorated.

Typically, the chemical reagents are using 2.5 kg water to every 1.0 kg of powdered cement blend, plus 6.0 kg of bentonite. Everything can be combined together in one delivery device because initially the bentonite cannot expand significantly—in the mixture of reagents there are just too many dissolved salts in solution. Alternatively, the SCM body can be positioned down a well bore and the water and powdered cement can be slurried and pumped separately into the same well bore.

It is also the case that the weight of bentonite has been pre-determined to be somewhat in excess of requirements for a plug to be formed—there is a deliberate determination of how much bentonite will be subjected to swelling to deliver the necessary pressure expansion in the well in order to plug it initially, and also a pre-determined quantity of bentonite that does not expand at that initial well plugging stage, but which remains in reserve.

Once the bentonite is swollen into a discontiguous solid mass, the expansive force is high and causes the swollen bentonite and reactive cementitious grout to push outwardly against the well casing interior wall, actively preventing failure or passage of well contents past the plug at the casing-seal interface. In some embodiments the plug can retain unhydrated bentonite which serves as a reserve supply, just in case the plug is disturbed. If that happens, it reheals by expansion of the reserve, actively sealing the well.

By introducing a source of a smectite mineral of a smaller dimension to the well bore along with a substance that can modify the hydration of the smectite into a well bore to limit or inhibit the smectite from forming a colloid during hydration (for mechanical inhibition of the formation of colloids), then the addition of sufficient water allows the smectite to hydrate to the point where the desired force is developed. The compressed smectite should have a sufficient compressed density that will allow intercrystalline expansion to occur such that the expanded smectite plug exerts a force on the well casing. The compressed smectite will contain an amount of water allowing a calculated force to be imposed on the well casing.

The expansion and sealing capabilities of such a compressed bentonite cylinder will ultimately be dependent on the montmorillonite plate arrangement and the final expansive force which can be generated thereby. While the plate arrangement occurring during expansion can introduce a mechanical failure plane due to the force between the aligned plates, and the alignment of the plates can also introduce a higher permeability path through the bentonite channel formation, the presently disclosed system strictly limits the colloidal expansive mechanism to make it possible to retain the low permeability of a compressed bentonite cylinder, after hydraulic expansion, while removing the shear failure mechanism.

The practical implementation of this research work meant that the following outcomes can be achieved:

The permanent occlusion of CSG well bore casings using a compressed bentonite cylinder, such that the dimensions of the cylinder allow passage of the cylinder down the well to the point at which the closure of the well is required.

The calculation of the expansive forces of the bentonite generated by the bentonite plug, and the prediction of the time taken for the plug to swell to close the well is directly related to the final hydrated bentonite density.

The failure modes of plugs and plugging media is directly related to either the frictional force between the casing and the plug or the frictional force between the bentonite plates, whichever is weaker.

Alignment of the montmorillonite plates may further produce an undesirable pathway through the plugs allowing pressure and liquid to be lost through the plug to the environment.

The published literature does not contain a unified expansive force calculation for all bentonites. Accurate force predictions for all bentonites can be generated based on the electrostatic ion-dipole, dipole-dipole derivative of the charge to size ratio of the embedded ion within the montmorillonite plate.

The physical mineral structure was hypothesised to produce an expansive force that is directly related to the inter-plate gap orientation. The expansive force is uni-directional. However, it is believed that when placed into an environment where the expansive force is restrained in two dimensions, such as at a cylindrical casing, the force can occur in a plane with two dimensions. It is therefore postulated that alignment of the plates can lead to creation of a potential pathway within the plug, where the unbound hydration atmosphere becomes pushed out by the well pressure, which in turn could allow a well plug to slowly weep pressure to the next plug in line.

The replaceable ions within the plates do not migrate from their position within the montmorillonite and remain within the plates when placed in deionised water.

The forces generated by the swelling bentonite plug may be used to increase the plugs frictional resistance to the displacement pressures generated by the gas reservoir.

Physical plate alignments occur during hydration, and it is the hypothesised movements of the montmorillonite plates at this time that is directly related to the inter-plate gap orientation mechanism.

Expansion Mechanism of Bentonite—Previous Issues and New Developments

Exposure to water "hydrates" bentonite by passing in between the layers and forcing them apart. In this way bentonite creates expansive force an addition to water. The expansive force can be up to about 650 MPa. Normally the clay expands detach and drift off to form an intercrystalline spacing in water.

When such a wet clay is located in a physical restraint, such as a cylindrical well body, the clay expands exactly as before but this time those separated plates get pressed up against the cylindrical walls. As this happens, those clay plates become oriented in line with the cylinder walls. The compressed clay core continues to expand and crushes the colloid back to a point where the force between the core and the cylinder wall becomes equal. This is plate alignment.

The problem experienced in the past is that the clay now has plates running parallel with the casing it therefore makes it possible for the plug to shear internally displacing the majority of the core of the plug. The aligned plates also act as a channel for the well contents to move up the channels between the plates, leaking through the plug.

Bentonite clay is consumed in many applications, some of which exploit that swelling characteristic. It swells when bentonite absorbs water into the space between the parallel plates, the expansive behaviour coming about from the hydration of ions embedded at the major face surfaces of the montmorillonite plates.

There are two terms which are sometimes applied to bentonite. The definition of a colloid and a thixotrope needs to be rationalised (FIG. 5).

A colloid is a material consisting of at least one type of dispersed particle in a second medium, where the colloid particles are kept apart by a repulsive force which balances a second, attractive force which attempts to drive the dispersed solids towards agglomeration. In a colloid the particles do not physically rest on each other to maintain their position.

A thixotrope is a weak structure created when lath-like or plate-like particles form a mechanical bridging structure. Importantly, the thixotrope breaks on the addition of a small force and having space into which the particles can move, it allows them to flow until the force is removed whereby the bridging structure is reformed.

The current theoretical electrical double layer expansion mechanism for colloids, and by default, montmorillonite, is the culmination of sequential modification of the original basic concept of the development of an electrical double layer.

For montmorillonite the diffuse double layer introduced the concept of a hydrated ion within the inter plate gap which mechanistically extends the distance over which the charge is effective. Conceptually, these were considered as point charges with the expansion being driven by the ion's acquisition of a hydration atmosphere, the hydration atmosphere then mechanically forces apart the plates.

The particles then maintain a gap, which is the balance point between the Van der Waals attraction and the electrostatic repulsion (FIG. 6). This theoretical approach has been adapted and used as a model, in an attempt to describe the expansive forces generated by montmorillonite on hydration. In the montmorillonite model, the aggregation of charged ionic solids through aqueous media is reversed to give expansion.

Complicated by factors such as the degree to which the diffuse double layer is developed, the orientation of the plates to each other during expansion, the direct attraction of water molecules to the montmorillonite plate and the repulsive action of this hydration layer to an adjacent plate's hydration layer, the water dipole structures causing mechanical surface tension effects, the wide distribution of montmorillonite plate sizes, the independent electrostatic attraction forces of the plates, solvent and solutes, the ion size and charge and the loss of the diffuse double layer as the plates are externally forced together. Further complications arise from the nature of the raw bentonite itself in that it is a naturally derived material and contains a number of different ions which have different charges in the single sample.

When montmorillonite expands in a coal seam gas (CSG) well casing, it expands in all directions until the hydrated clay contacts the vertically oriented walls of the casing. The pipe walls restrict and restrains further expansion in the horizontal direction by pushing back against the horizontal expansion. It is at this point when montmorillonite exhibits an unexpected if not unique behaviour, causing the randomly orientated plates to rearrange themselves in a parallel array with the restraint (ie with the inner circumferential wall of the well pipe. This causes the bentonite during hydration to leak through the plug close to the casing wall, as shown in FIG. 7.

Bentonite expansion is directly related to the physical morphology of the montmorillonite mineral. It is understood that the expansion and thereby the forces generated on expansion are a direct result of the accumulation of water molecules between the plates. Fundamental to this expansion is the non-contiguous nature of the montmorillonite mineral. The manner in which the physical plates (which make up the structure of the mineral) move relative to one another during expansion contributes to not only to the magnitude of the expansion, but also the direction of that expansion in three dimensions. Montmorillonite plate behaviour has been the subject of some modelling, otherwise known as plate alignment theory (PAT).

When discussing plate separation during expansion, it is best to begin with just two plates. In the PAT model, the plates can behave in one of two ways. Firstly, two parallel plates will separate exerting a total unidirectional force in both directions equal to that of the force between the plates causing the expansion. The direction of that uniaxial force will be directly in line with the axis of the expansion and perpendicular to the axis of the plates (FIG. 8)

However, this simple two plate example will follow a different expansive pathway if the plates partially overlap. This complication is more often the case as there are no direct forces which cause the plates to perfectly align. When partially overlapping plates expand, the uniaxial expansive force is only applied to one part of the plate leaving the other part of the plate unaffected. The partial overlap causes the plate to develop a point of rotation directing the plates to change their aspect to each other (FIG. 9).

As there are many plates within the montmorillonite mineral the expansion will be the sum of all the plate rotations. In this case, if no restraint is encountered, the expansion is the average of all the different plate aspects, producing an overall spherical expansion.

During expansion, if the montmorillonite plates meet a restraint, such as a physical barrier, the plates adjacent to the restraint will become selectively orientated with the plate's long axis parallel to the barrier (FIG. 10). The alignment is due to the plate being unable to pass through the barrier, while the force between the plates, closer to the core of unexpanded montmorillonite, continues to attempt to drive the hydrated plates outward. As the compressed bentonite continues to hydrate and feed montmorillonite plates into the already crowded bentonite-casing space, the spacing between the plates continues to diminish and the inter-plate force begins to build up, moving from colloidal to inter-crystalline spacing. At this point the hydrated density rapidly increases and causes the parallel plates to generate a force perpendicular to the casing and become recompressed bentonite.

The expansion, leading to plate alignment is only parallel where the compressed bentonite and casing are parallel. Near the top and bottom of the casing-bentonite interface, the plates remain to a degree, oblique to the compressed bentonite. This causes any force generated to move the plate out of alignment producing a zoned heterogeneous arrangement of spherical and aligned expansion plate regions (FIG. 11). Where the plates lie outside the "cone of force", they produce forces in all directions and the plates within the cone of force produce a perpendicularly aligned expansive force to the casing.

Plate alignment can be modelled in three dimensions by considering two theoretical balls of compacted bentonite, one with no restraint, and one within a cylinder. The unrestrained ball of compacted bentonite will swell equally in all directions to give a spherical colloid. The ball within a cylinder will expand until the restraint is encountered. Where upon the expansive forces align the plates parallel to the restraint, while the unrestrained portion of the ball will continue to expand to form a sphere.

The alignment of the plates in the restrained plate alignment model (PAT) model generates a cone of force (FIG. 12) which is perpendicular to the restraint and runs from the centre of the ball, the point of minimum expansion to the edge, the point of maximum expansive force against the restraint. In three dimensions these cones of force overlap and form an expansion plane which is perpendicular to the restraint (FIG. 13).

A refinement for this PAT model is to consider the two modes of expansion together such that the restrained aligned plates form a disc from which the spherical expansion is subtracted, the dimension of the spherical expansion is directly limited by the diameter of the cylindrical restraint (FIG. 14).

In the final PAT model, the key value for expansive force is the difference between the plug diameter and the cylindrical restraint. However, the cylindrical restraint diameter also governs the diameter of the unaligned or spherical expansion. If this is applied to a cylindrical plug of compressed bentonite, this relationship predicts both the effective plug length converted to colloidal bentonite and remaining plug which can generate an expansive force perpendicular to the restraint. Should a short, narrow cylinder of bentonite be placed in a large cylindrical restraint then the spherical expansion from the unrestrained ends of the bentonite cylinder will overlap leaving a ring of bentonite with aligned plates around the inside of the restraint as shown in FIG. 15.

In the experiment which generated the result shown in FIG. 15, the volume of the plug was very small, all of the bentonite formed an expanded hydrated mass. However, the central section was predicted to fall within the two spherical expansion zones. The spherical expansion calculation tool indicated that the two spherical expansions from a 25 mm diameter, 22 mm height plug when placed in a 32 mm plastic tube would generate a hole in the middle while leaving a ring of parallel plates around the inside of the cylinder.

FIG. 15 shows that the central region remained in a colloidal form and left the aligned plates in a conical ring around the inside of the pipe. The central region, being unable to support its own weight out of water, collapsed and fell away, whereas the stressed ring does have some integrity due to the alignment of the montmorillonite plates and was able to support itself. Adapting this expansion mechanism to a cylindrical plug with a central hole indicates that as the plug is elongated, the central void will theoretically close and finally form a dense colloid. If only one end is fully exposed to the water reservoir, the spherical expansion will only form a spherical mass on that end.

Compressed bentonite cylinder height=22 mm
Compressed bentonite cylinder diameter=25 mm
Restraint internal diameter=32 mm
Expansion rate equivalent on all surfaces
Expanded cylinder diameter=32 mm
Expansion per surface=(32-25)/2=3.5 mm
Expanded cylinder height d=22+expansion×2=29 mm
Radius of top sphere r=Restraint internal diameter/2=16 mm
Radius of bottom sphere R=16 mm
Distance between spheres=expanded height=29 mm
Diameter of opening created by convergence of the upper and lower colloidal expanded spheres=α

$$\alpha = \frac{1}{d}\sqrt{4d^2R^2 - (d^2 - r^2 + R^2)^2}$$

$$\alpha = 13.53 \text{ mm}$$

Observed opening 16.86 mm

Colloidal Swelling

From the empirical data (FIG. 16) it can be seen that the initial free swelling rates of different density bentonites is fairly constant, and the time taken to reach a stable maximum expansion is linked to the starting density of the sample. This is an indication that it is the total number of plates within the starting sample that governs the final size of the expansion.

On the hydration of a compressed bentonite core, montmorillonite acquires water molecules between the plates and generates an expansive force (intercrystalline expansion) inversely proportional to the distance between the plates. As the distance between the plates, close to the compressed core is small, limited by the availability of water molecules, the force of expansion is large and pushes the adjacent previously hydrated plates away from the compressed core. In this way the bentonite expands until the compressed core is consumed. The montmorillonite plates which have formed a colloid, retain their hydration atmospheres even when they have become isolated from each other.

Plate Alignment and Bleed Failure Mode

As described, when a compressed bentonite cylinder is hydrated within a casing, the early hydration phase will initially produce a colloidal zone which becomes forced away from the hydrating compressed bentonite core by the intercrystalline hydration of previously compressed bentonite clusters. As the number of hydrated plates increase in the anulus between the compressed core and the casing, the colloid formed will be driven away from the compressed core and will approach the casing. One the colloid front reaches the casing it can no longer be pushed out as the casing restricts the colloids movement.

The continued hydration of the remaining compressed bentonite cylinder continues to spall bentonite plate into the anulus, the colloid is placed under increasing pressure, reducing the colloid inter-plate average distance. In doing this, the intercrystalline expansive force, which is much greater than any colloidal force, will effectively reverses the free expansion and recompresses the montmorillonite clay. Therefore, the inter-plate gap will reduce and reinstate the intercrystalline expansive forces. The expansion of the compressed region will continue until it reaches a point where the inter-plate expansive forces of the recompressed colloid equals that of the expanding force of the remaining compressed bentonite cylinder, at which point the expansion stops. The result of this expansion is the formation of a zone of plates, parallel to the casing wall and running along the casing axis.

The Montmorillonite plates are impermeable in the direction perpendicular to the orientation of the plates due to the inability of water molecules to pass through the plate rather than along the plate. However, when the expansion causes the plates to orient parallel to the casing walls, passageways are formed through which fluid may pass through the compressed bentonite cylinder under circumstances of very low pressure increase.

Normally, the flow rate of a liquid through a pipe can be calculated from the cross sectional area, length of the pipe and the flow rate. If we consider the channels created through the bentonite by plate alignment as a pipe, it can be seen that the cross sectional area of the channel is a direct result of the inter-plate separation force. Hence the bentonite expansive force which is also dependant on the inter-plate separation will limit the flow rate.

For a system which has a fixed flow rate, the pressure will become directly proportional to the channel cross sectional area and in so doing become controlled by the expansive forces generated by the montmorillonite mineral during hydration. If a restriction is placed on the flow the pressure generated by a fixed volume pump will increase until the flow rate is achieved. To test the validity of the bleed concept, compressed plugs were allowed to hydrate and expand then subjected to a fixed rate of water flow.

When subjecting a column of plugs to a fixed flow of water, the plugs will fail, either by friction at the bentonite-casing interface, within the plug at the least resistant plane failing at the bentonite-bentonite interface by shear or through a channel through the plug along the aligned plates termed bleed.

There are two components to bleed failure, the first is the isolated pressure required to pass through the aligned region of the plug. Having created a channel through the plug there will be an associated resistance to flow as found in all pipe flow calculations r. In this case however, the plugs are seen as contiguous and the resistance to the flow is simply the cumulative result of the increasing channel length r1+r2+r3 . . . . In this case the pressure will rise linearly with total length of penetration (FIG. 17).

By combining both of the above profiles, the bleed failure can be predicted where the individual aligned zones are seen as increased peaks distributed along a linear increasing flow resistance (FIG. 18).

Once the pressure required to penetrate a plug reaches the same value as the cumulative resistances to flow, R=Σr, The plugs are exposed to their failure pressure while the existing resistance to flow becomes the failure pressure. In this case the pressure never falls below the pressure required to fail the plug and the plugs continue to fail in succession.

Empirically this can be seen to occur if a compressed bentonite cylinder is somewhat more difficult to penetrate than normal. In this case there is a sudden failure and reduction in the failure force, yet due to the abnormal increase in force the compressed bentonite cylinder failure force is surpassed and the next compressed bentonite cylinder partially fails without returning to the recovery force (FIG. 19 plug 4-5).

In a pressure-based environment once the bleed channel has formed in the bentonite cylinder, it then slowly bleeds pressure to the next bentonite cylinder. It is suggested that once the channel has formed and the bentonite cylinder is penetrated, the pressure drops, and the channel begins to close. The rate of re-expansion of the bentonite plates is slowed by the expansion mechanism needing to rebuild the water structures between the plates. While this happens the channel is held open for sufficient time to allow the pressure to drop to a value represented as the residual flow resistance pressure.

FIG. 20A represents an expanded bentonite cylinder before the pressure has reached a level sufficient to distort the distribution of the bentonite plates. As the pressure builds up it is possible to force a channel through the bentonite cylinder overcoming a localised force (FIG. 20B). As the penetrating pressure R is dependent on the expansive force of the bentonite within the bentonite cylinder it is possible to formulate a model to predict the bleed penetration pressures.

Compressed Bentonite Cylinder Failure Modification

It can be seen that the physical and mechanical expansion of montmorillonite has a direct effect on the available failure mechanisms. While expansion aids the frictional component of the compressed bentonite cylinder, it also introduces both shear and bleed failure modes. Modification of bentonite plugging technology to form competent seals requires the deliberate modification of the expansion sequence to limit the plate alignment while retaining the intercrystalline expansive force component. To achieve this, the removal of the colloidal formation component of the mechanism is required. The simplest way of achieving this is to prevent the movement of the plates to form colloids.

Cemented plugging is prone to failure and chemical attack These degradation mechanisms are related to the chemical nature of the Portland cement hydrate. Portland cement is not the only hydraulic medium available, although many of the most common alternatives are quite expensive. Also, the pore solution concentration is too high to allow effective swelling forces to be achieved.

The hydratable combination cement grout disclosed in this specification is a deviation from the normal hydraulic pathway, and utilises environmentally stable hydration products. This cement grout alone is insufficient to form a plugging seal as it is utilised at an extremely high water powder ratio. On expansion of the compressed cylinder, the colloidal formation normally associated with bentonite hydration is prevented by mechanically holding the plates in place and preventing the colloidal hydration product from forming.

EXPERIMENTAL RESULTS

The plug and grout combination was examined in an experimental well facility in which the largest diameter well segments, D=193.7 mm.

Compressed bentonite cylinders of density 1.76 gcm$^{-3}$ and size 139.7×240 mm were allowed to hydrate in a 193.7 mm ID casing for 3 months. The cylinders generated a hydrated mass with a density in the order of 1.36 gcm$^{-3}$. The lateral expansive force forms a hydrated bentonite cylinder of 193.7 mm size, which generates a frictional slip failure at pressures in the order of 43 KPa (see FIG. 21)

The empty casing was then partially filled with the grout disclosed in this specification and mixed at a water powder ratio of 2.5:1 and a duplicate 139.7×240 mm compressed bentonite cylinder was introduced into the grout so that the cylinder was completely submerged. This system was then left to hydrate for 3 months. After the hydration period the single grouted compressed bentonite cylinder within the casing segment was mounted onto the three well facility platform and the seal pressure was tested.

FIG. 22 demonstrates different stages of the pressure testing of the above mentioned grouted bentonite cylinder. Initially the seal resists the displacement pressure being applied (I). Once a sufficiently high pressure is reached the plug begins to slip, breaking adhesion to the casing wall and failing by friction, as this is an inelastic system, leading to a sudden drop in applied pressure (II). The plug continued to be displaced until the frictional force, due to irregularities within the casing surface, becomes greater than the displacement force and the plug stops moving. Once this occurs the pressure behind the plug increases leading to a second slip failure (IV), however, the magnitude of the friction had reduced either because of the mechanical attrition of erosion of the soft grout by the casing or requiring the bentonite to re-expand to fill the gap.

The magnitude of the displacement pressure for the grouted cylinder seal yielded a 11400% improvement over the compressed bentonite cylinder which was not grouted. (Grouted plug 4679 kPa versus 40.93 kPa non-grouted plug). The system was then left for three weeks to determine if the new system retained the self-healing capability of bentonite.

In all testing, the pump was set to a very slow flow rate so that the pressure rate increase was restricted to the rate that would trigger a bleed category failure. It was important to determine that although the plug had indeed healed by secondary bentonite expansion, the intercrystalline expansion had not resulted in the formation of a bleed pathway through the newly expanded section. The slow increase in pressure indicated that the single plug had self-healed to a degree. On pressurising the plug, a change was observed in the rate of pressure gain in the early resistance which resulted in a higher resistance pressure (FIG. 23).

If the subtraction is applied to a cylindrical plug of compressed bentonite, this relationship predicts both the effective plug length, the ineffective portion of the cylinder converted to colloidal bentonite and remaining compressed bentonite cylinder which can generate an expansive force perpendicular to the restraint. Should a short, narrow cylinder of bentonite be placed in a large cylindrical restraint (such as a wellbore casing) then the spherical expansion from the unrestrained ends of the bentonite cylinder will overlap, leaving a ring of bentonite with aligned plates around the inside of the restraint. In the experiment which generated the result, the dimensions of the compressed bentonite cylinder was 25 mm diameter and 22 mm high, allowing all the bentonite plates in the plug to become hydrated. The central region remained in a colloidal form and left the aligned plates in a conical ring around the inside of the pipe. The central region, being unable to support its own weight out of water collapsed and fell away, whereas the stressed ring had some integrity due to the alignment of the montmorillonite plates and was able to support itself.

Results from Experiment #1

The permanent occlusion of a CSG casing resulted from the use of a compressed bentonite cylinder which was designed with a cylindrical shape and dimension to allow passage of the cylinder down the length of a well to the point at which the closure of that well is required, by way of expansion of the plug.

The calculation of the expansive forces of the bentonite generated by the bentonite plug, and the prediction of the time taken for the plug to swell to close the well is directly related to the final hydrated bentonite density.

The failure modes of plugs and plugging media is directly related to either:

(a) the frictional force between the interior wall of the casing and the exterior perimetrical wall of the plug, or (b) the frictional force between the overlaid colloidal bentonite plates, whichever is weaker.

Alignment of the montmorillonite plates at the inner cylindrical wall of the well may further produce an undesirable fluid pathway through the gap between the inner cylindrical wall and the exterior wall of the plug, which can allow pressurised gas and liquid to be lost through the plug to the environment.

An accurate prediction of the expansive force can be achieved by understanding electrostatic ion-dipole, dipole-dipole derivative of the charge to size ratio of the embedded ion within the montmorillonite plates.

The physical mineral structure was hypothesised to produce an expansive force that is directly related to the inter-plate gap orientation. The expansive force is unidirectional. However, when placed into an environment where the expansive force is restrained in two dimensions, such as a cylindrical casing, the force can be seen to occur in a plane with two dimensions. It is also therefore postulated that by aligning the plates there is the creation of a potential pathway within the plug, where the unbound hydration atmosphere becomes pushed out by the well pressure, which in turn could allow the plug to slowly weep pressure to the next plug in line.

Bentonite V Current New Formulation—Test to Failure

A bentonite plug of size 139.7 mm ϕ 240 mm high was placed in a 193.7 ID casing. The graph of FIG. 24 describes an unmodified bentonite plug failure at 38.7 kPa pressure at the casing-grout interface, where the bentonite SCM was hydrated in potable water.

Conversely, when a compressed Geobandon plug, which comprised the hydratable combination cement grout disclosed in this specification in conjunction with the bentonite SCM, of the same size (139.7 mm ϕ 240 mm high plug) was placed in a 193.7 ID casing, the test result is shown in FIG. 25. FIG. 25 describes the Geobandon plug failure occurring at 4768 kPa at the casing-grout interface, when the compressed bentonite SCM and cement grout plug was hydrated in potable water.

This is over 11500% increase in performance in comparison with the use of an unmodified bentonite SCM plug.

In summary the experimental results showed that greatly improved plugging of hydrocarbon wells could be achieved using a compressed plug of bentonite. The Bentonite can naturally expand, but in doing so, failure pathways can be created through the plug. However, if the expansion mechanism is modified, this can eliminate the failure pathways. It was demonstrated to strongly seal at 5 psi for a 10" plug up to 691 psi for a 10" plug. Should the seal become damaged, the plug swells up and expands in such a way as to recreates or re-heal the seal.

Cement alone is subject to shrinkage and to chemical attack. If carbon dioxide is present in the well, it will also have a degradation effect on the stability of the usual Portland cement paste and hydrated matrix The chemical substance used in conjunction with the SCM in this specification is a two-component, very high-water content grout, and a customisable compressed plug.

When it is formed, the slurry of the grout contains fine bentonite particles comprising montmorillonite plates which block up all of the tiny fractures in the rock, and form a healing seal within the strata, well body, or cavity in which it is located.

Due to the chemical composition of the hydratable cements which are the main constituents of the grout, over time ettringite (an expansive hydrate crystalline product) forms and absorbs ionic solutes from the water present in the well.

As the ettringite expands, it promotes both an increase in the rate of release of montmorillonite platelets, so that the bentonite undergoes an expansive transformation which forcefully expands and crushes the ettringite mineral against the well bore or well casing.

Such a direct engagement with the nearby structure of, say, a well casing is key, because it investigations have shown that by taking steps to avoid the formation of a colloid (aligned plates) at the inner casing walls, immediately adjacent to the hydraulic plug means that plug bleed and shear failure modes, which normally occur around the contact point between the plug and the well casing, can be avoided, and the plug is no longer at risk of dislodgment or detachment.

Once the bentonite has expanded, the seal is completed by the second phase hydration of the grout which then grows Strätlingite crystals into any space available including between the montmorillonite plates, permanently forming a blockage where leaks could otherwise form.

Bentonite is now restrained by the casing, and can remain so while ever some of unexpanded montmorillonite is retained in a reserve which is available to expand by the same physiochemical processes, in case the plug is disturbed. The bentonite can also expand into any perforation in the casing too, so it will also attempt to remediate stress fractures, associated leakage paths etc.

Comparison of Using Bentonite Alone and the Current New Grout Formulation

A hypothetical well abandonment problem was undertaken using a simple well design.

Well depth=5250 feet

Well diameter="6 inch" (145.36 mm ID)

Residual pressure=2000 psi (13.79 MPa)

The bentonite sealing approach used in the past in California is limited to a pressure differential of 500 psi. However, that limit is not related to the depth of the well or height of the plug. Under those regulations, for this theoretical exercise, any normal bentonite plugging attempt would be prohibited. The failure modes of bentonite follow three separate mechanisms: frictional displacement, shearing within the plug at the plug periphery, and bleeding through the channels caused by plate alignment. Of the three modes only bleed is independent of the height of the seal. As an example, the above data a design was produced indicating that the frictional, shear and bleed failure routes produced very different forces.

Frictional failure is the highest-pressure failure resistant displacement possible with just bentonite alone.

The Shear failure mode is proportional to the force produced by expansion and the height of the plug, as this relationship is linear, doubling the height of the plug only doubles the force required for displacement. In terms of failure pressures for long full-length plugs, a shear failure is over 10,000 times more likely to occur than a frictional failure.

Bleed however, is independent of plug height and will occur through each plug sequentially. This is why the Californian plugging limit is unrelated to the height of the seal employed, only to the pressure. Bleed is the weakest failure method and is very likely to occur in abandoned wells which have slow pressure build-up. It is only in faster pressure gain abandoned wells that bleed becomes less important. It is also worth noting that Bleed is also more likely to occur in production wells that have had high production rates due to the reservoir behaviour during resting.

By removing the very weak failure modes, the seal becomes extremely robust, 4.8 time stronger and resistant than frictional failure. The plug increases the coefficient of friction at the casing above that of bentonite.

A Failure Prediction Using Our Computerised Prediction Program.

The grout used in our experimental program is a monolithic seal and runs from the bottom to the top of the well. There is no need to set plugs at different depths. FIG. 26 shows the predicted effect of the length of a plug seal on the displacement or dislodgement pressure of the well plug, when considering the three separate mechanisms of seal failure known to occur for bentonite plugs: (a) frictional displacement, (b) shearing within the plug at the plug periphery, and (c) bleeding through the channels caused by plate alignment.

Of the three modes, bleed is independent of the height of the seal. Frictional failure is the highest-pressure failure resistant displacement possible when using just bentonite SCM alone, followed by shear failure. However, a seal made using a compressed plug comprising the hydratable combination cement grout disclosed in this specification, in conjunction with bentonite SCM is predicted by the modelling software to withstand the highest dislodgement pressure over any seal length.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments which will be described:

FIG. 27 comprises Table 1 which shows the chemical composition of the grout of the present invention, and which is used in the present inventive method and system.

Figure 1:
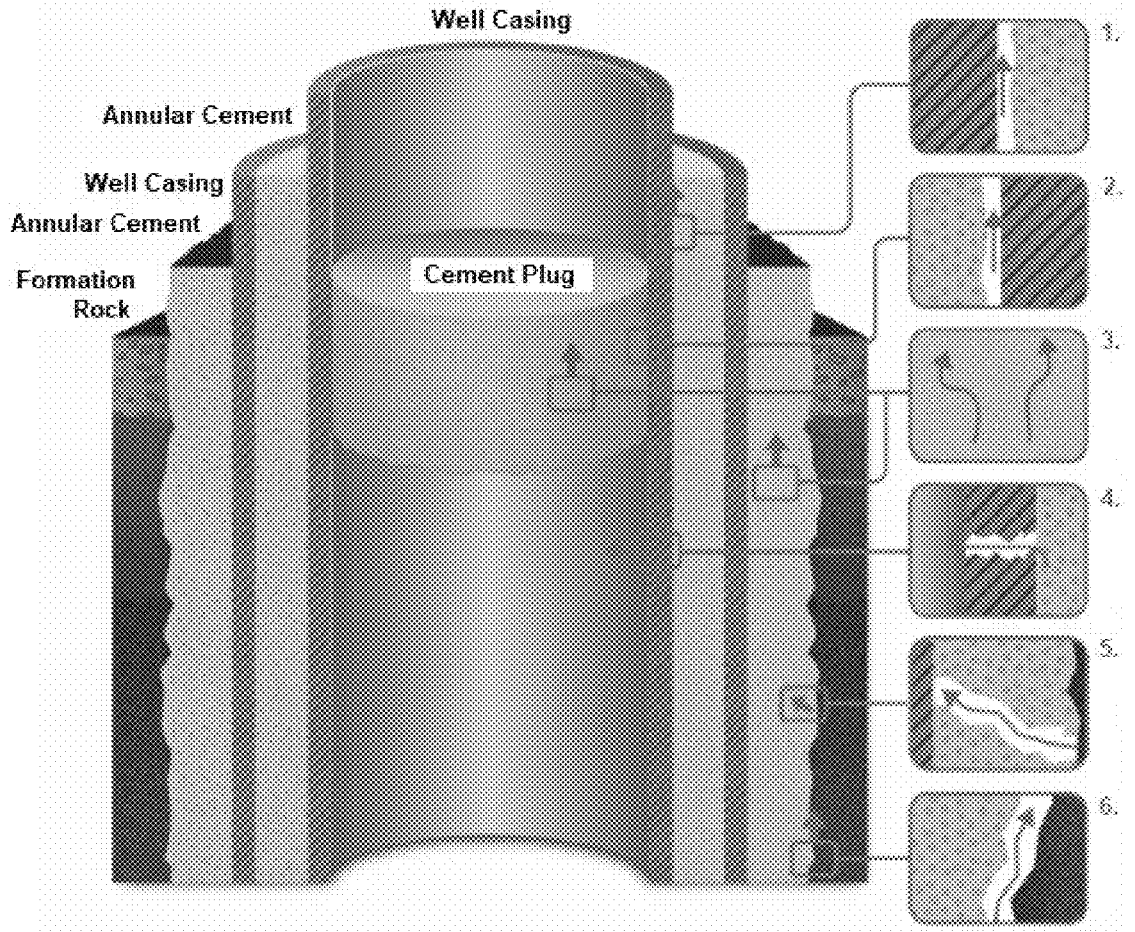
FIG. 1 is a schematic side sectional view of a vertical well located in surrounding ground showing typical leakage pathways for fluids to pass via the well and up into aquifers, or up to the ground surface, in accordance with the prior art.
Figure 2:
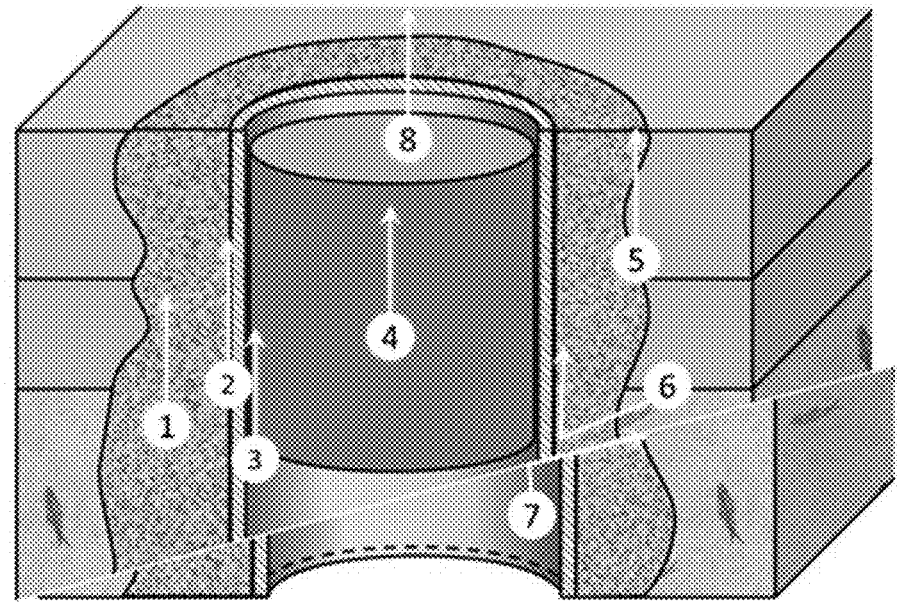
FIG. 2 is a schematic side sectional view of a vertical well located in surrounding ground showing typical leakage pathways for fluids to pass via the well and up into aquifers, or up to the ground surface, in accordance with a further embodiment of the prior art.
Figure 3:
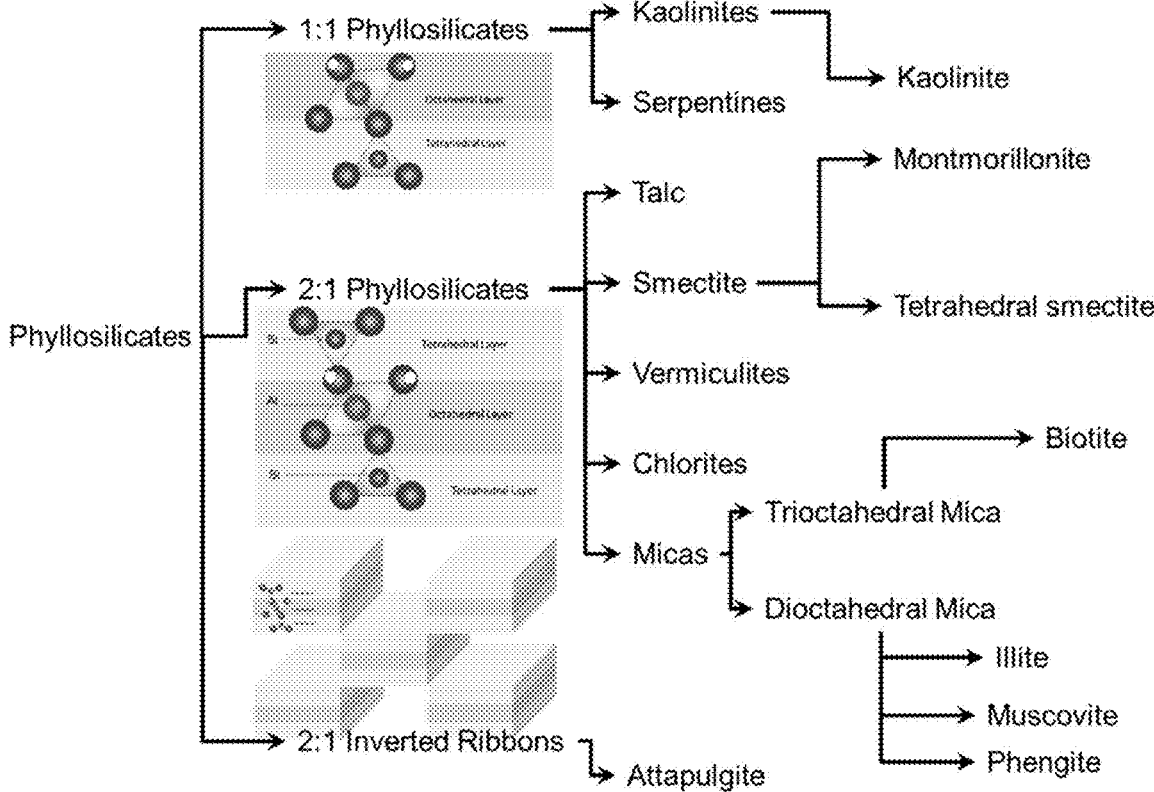
FIG. 3 shows a chart classifying the various clay minerals comprising phyllosilicates.
Figure 4:
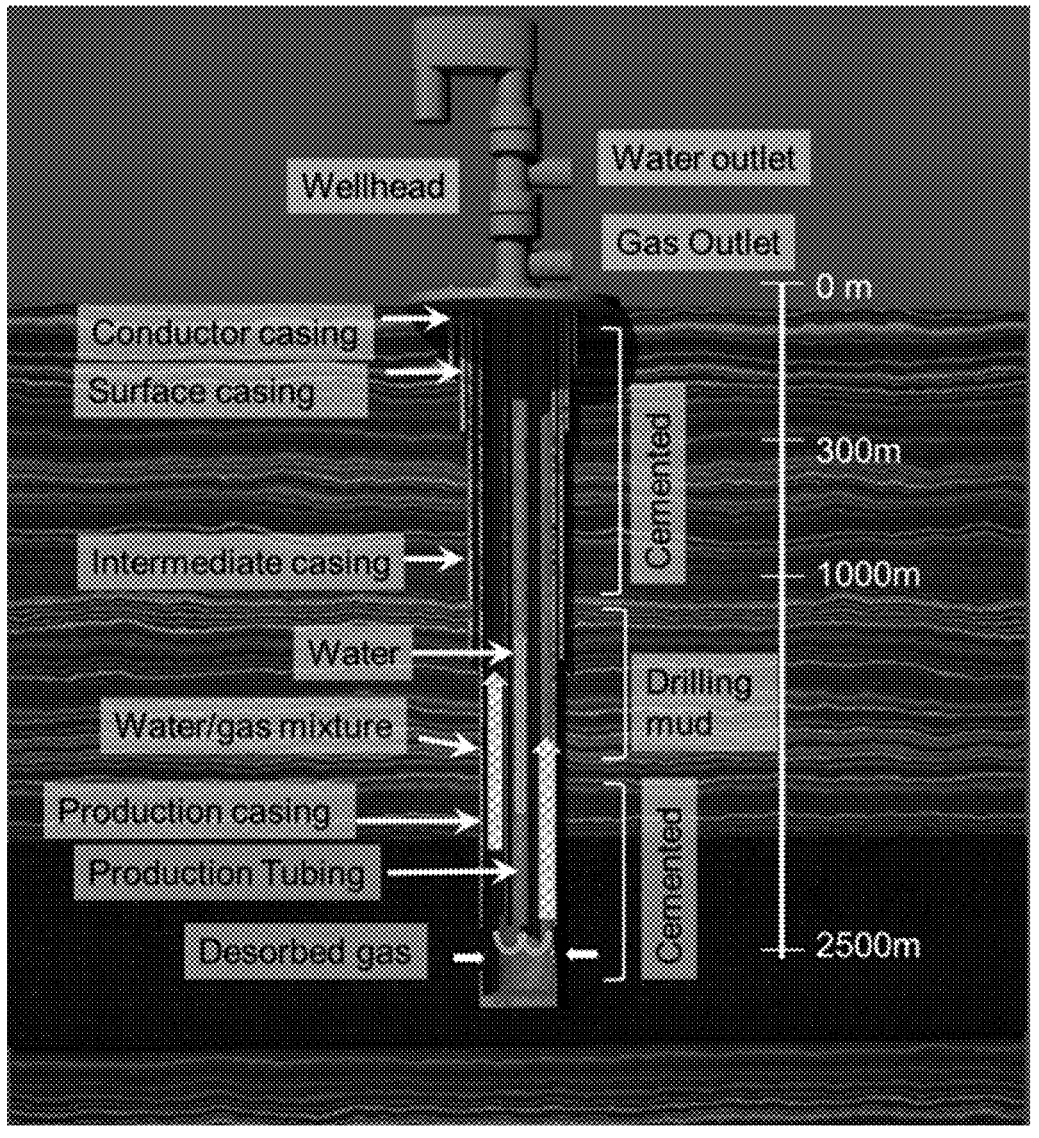
FIG. 4 shows a schematic side sectional representation of a well passing into the ground for retrieval of Coal Seam Gas (CSG) in accordance with the prior art.
Figure 5:
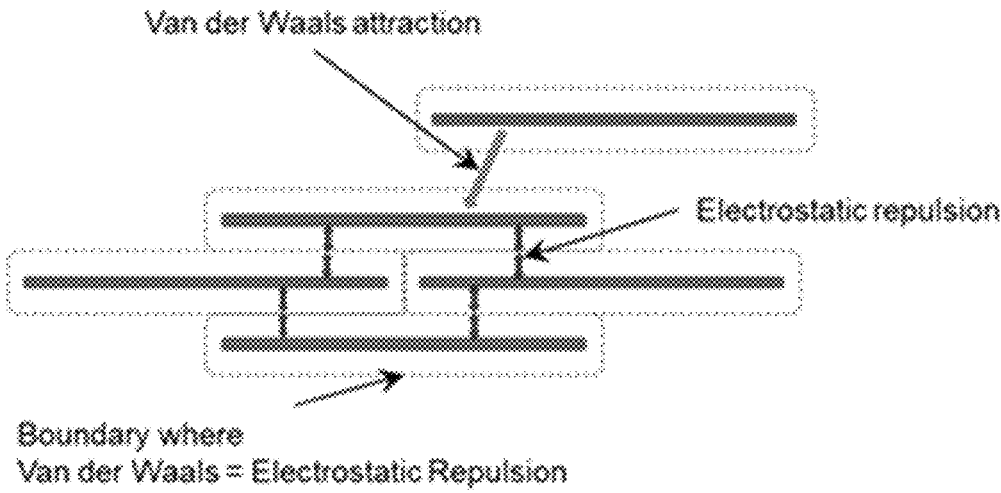
FIG. 5 shows a schematic, pictorial view of different platelet arrangements of bentonite in thixotropic and colloidal modes.
Figure 5:
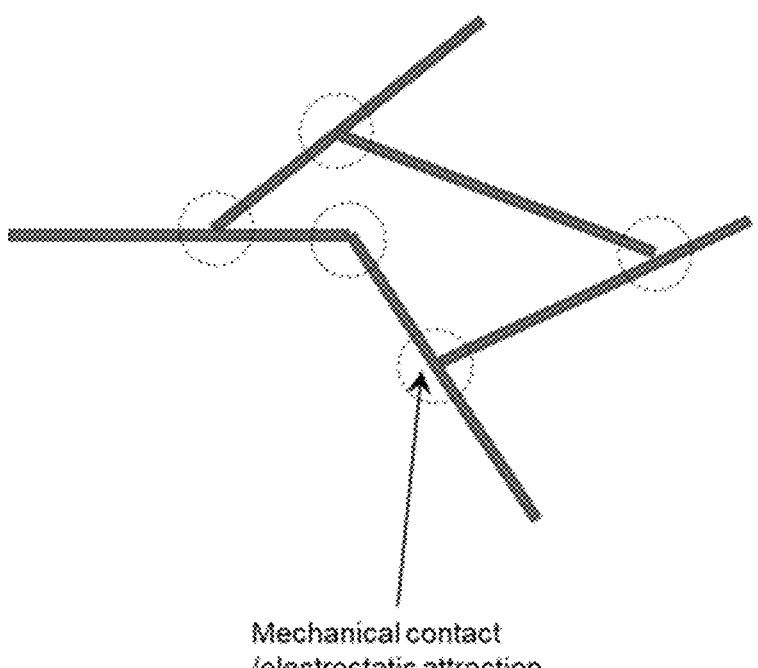
Figure 6:
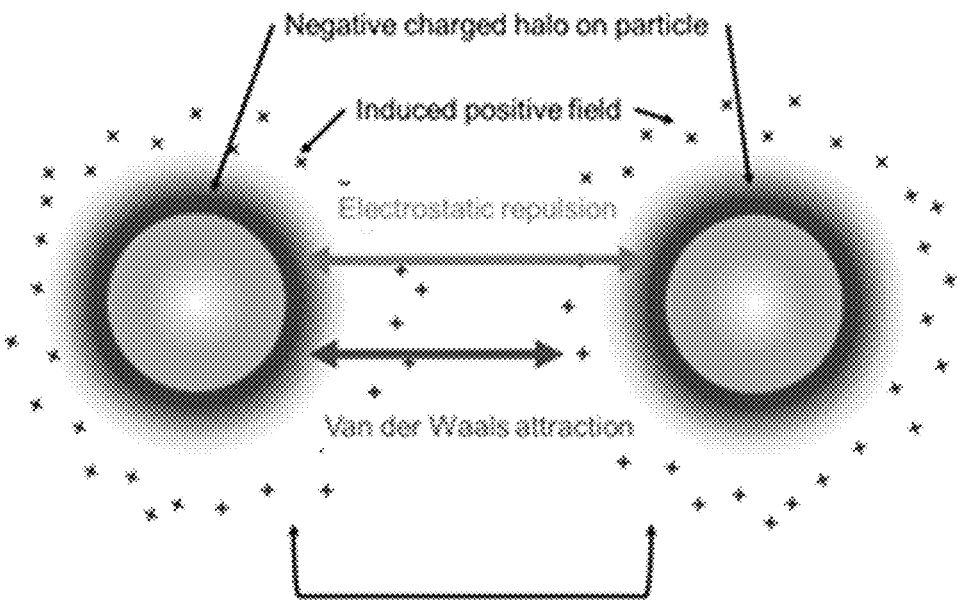
FIG. 6 shows a schematic, pictorial view of Van der Waals attraction and electrostatic repulsion interactions between particles.
Figure 7:
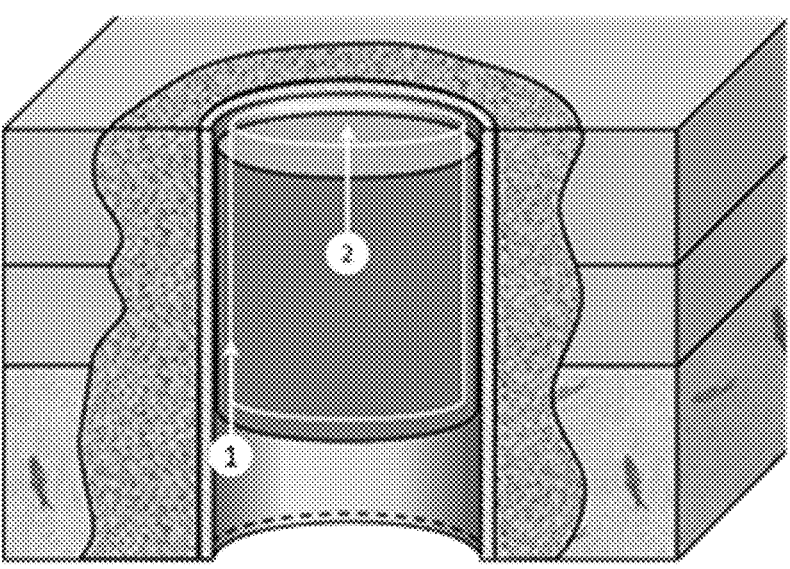
FIG. 7 shows a schematic, pictorial view of the expected failure modes when a bentonite plug is used in a well.
Figure 8:
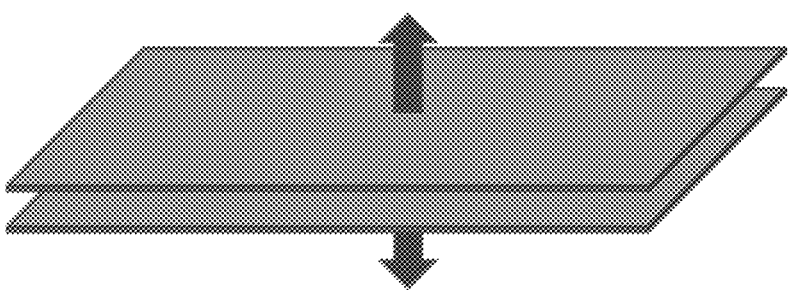
FIG. 8 shows a schematic view of perpendicular plate expansion in aligned plates of montmorillonite.
Figure 9:
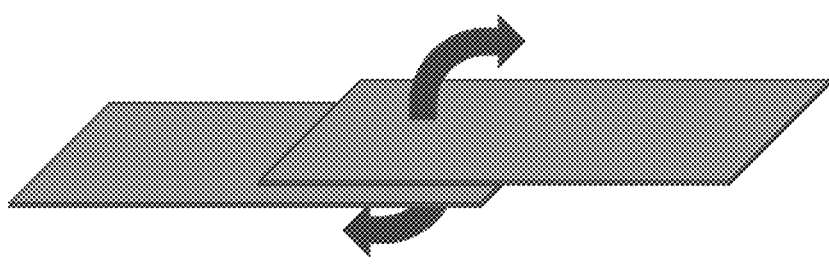
FIG. 9 shows a schematic view of plate rotation on expansion in nonaligned plates of montmorillonite.
Figure 10:
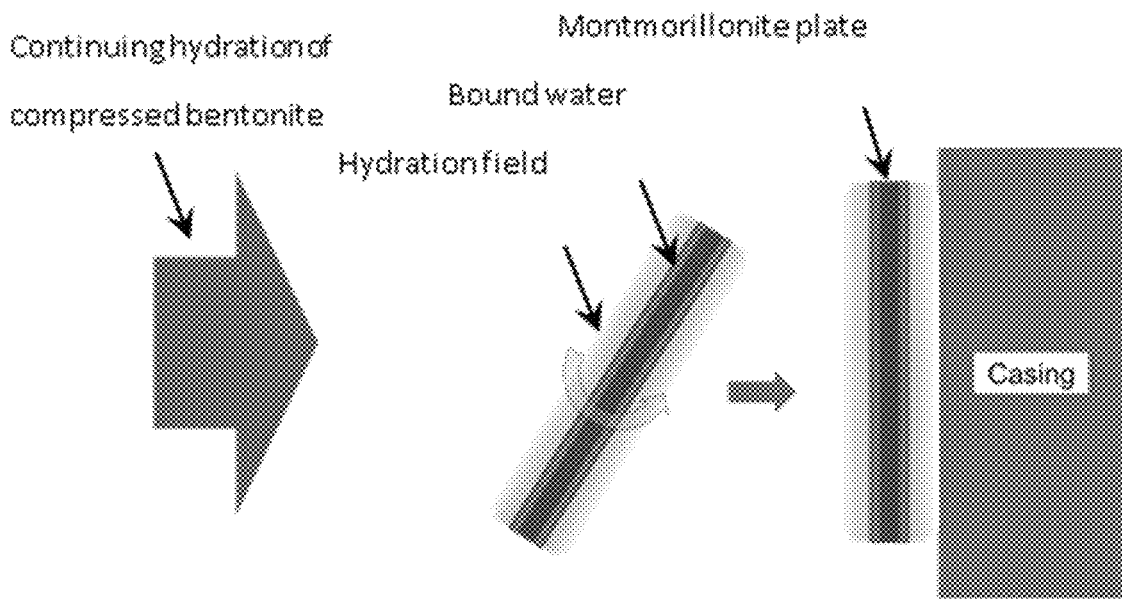
FIG. 10 shows a schematic view of plate alignment in the colloid forms at the casing interface.
Figure 11:
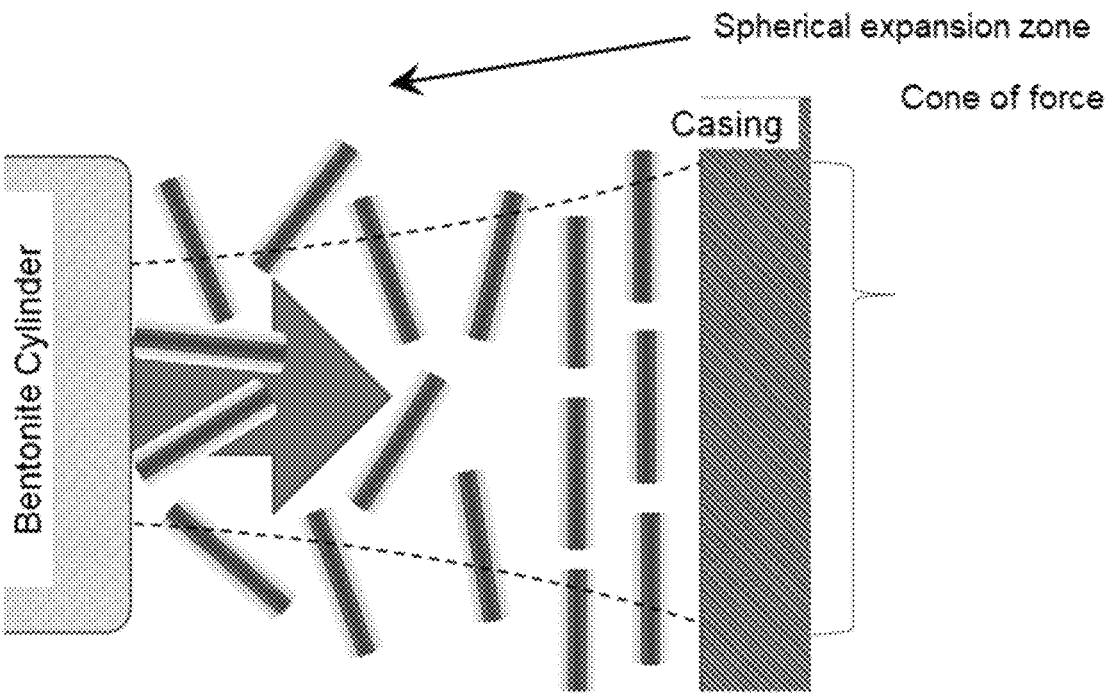
FIG. 11 shows a schematic view of the montmorillonite plates within a "cone of force" producing a perpendicularly aligned expansive force to the casing, and also an adjacent spherical expansion zone is generated, during hydration.
Figure 12:
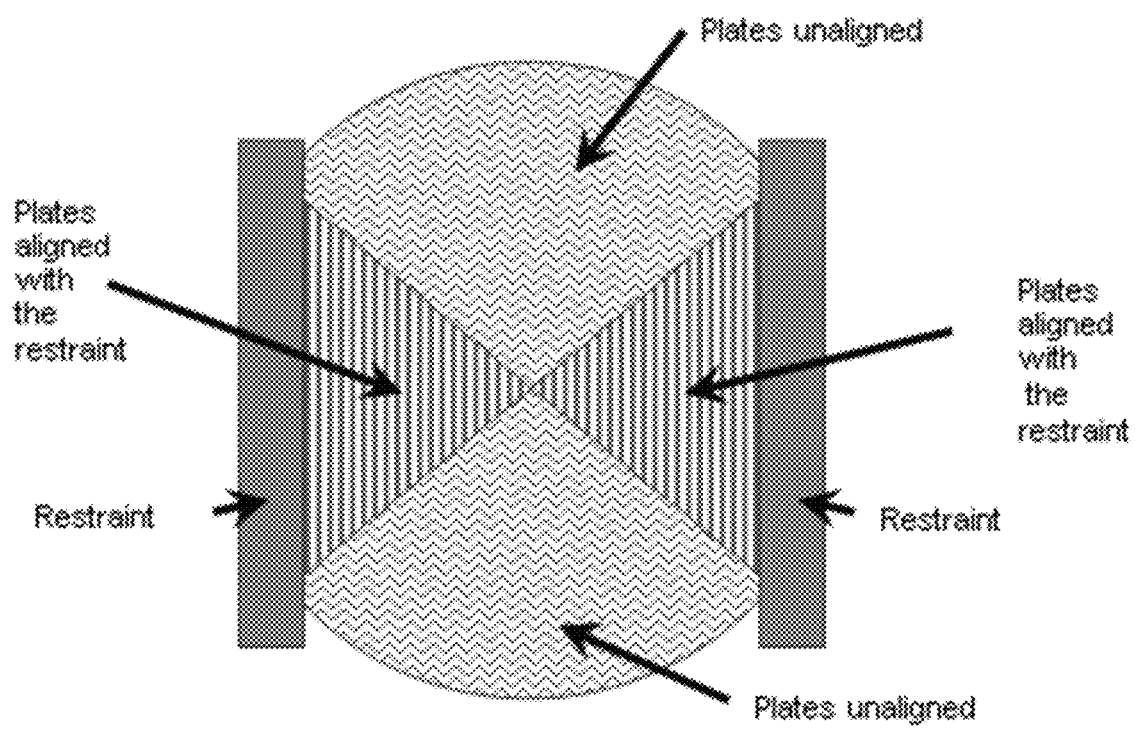
FIG. 12 shows a schematic view of the "cone of force" per the embodiment in FIG. 11.
Figure 13:
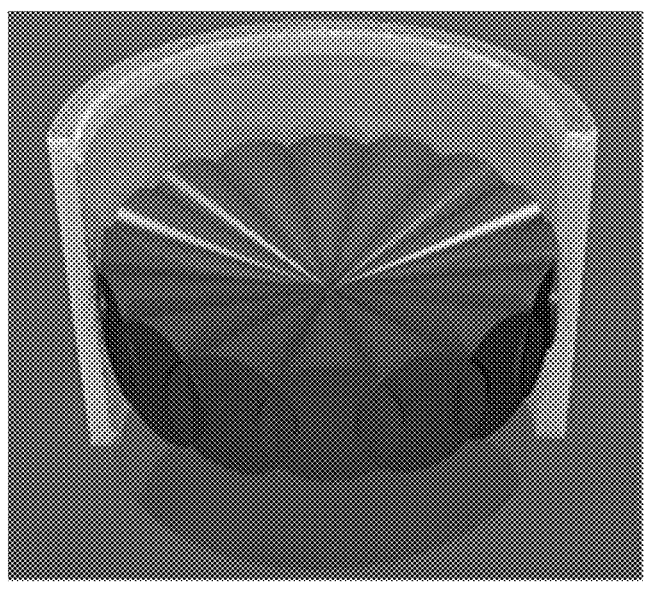
FIG. 13 shows a schematic view of the overlapping cones of force per the embodiment in FIG. 11, now forming an expansion plane of force which is perpendicular to the casing.
Figure 14:
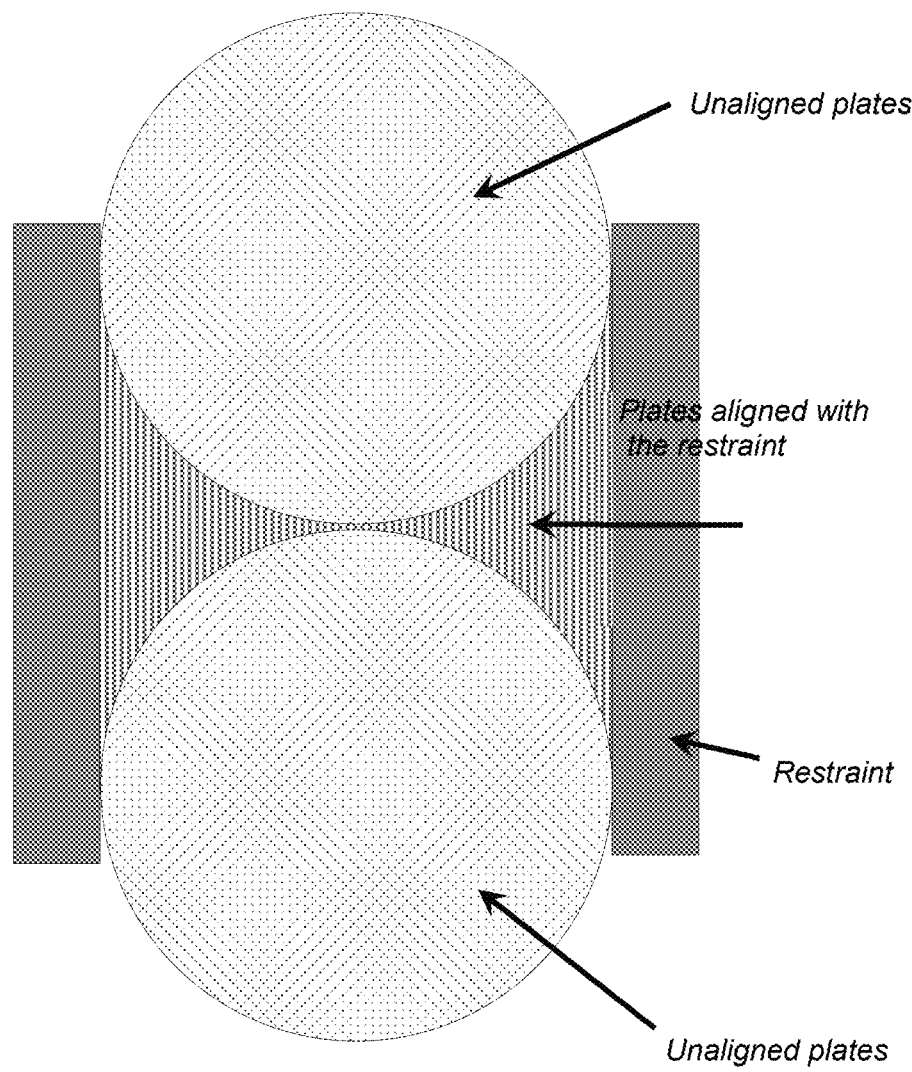
FIG. 14 shows results of a dynamic expansion model using zonal differential expansion concept.
Figure 15:
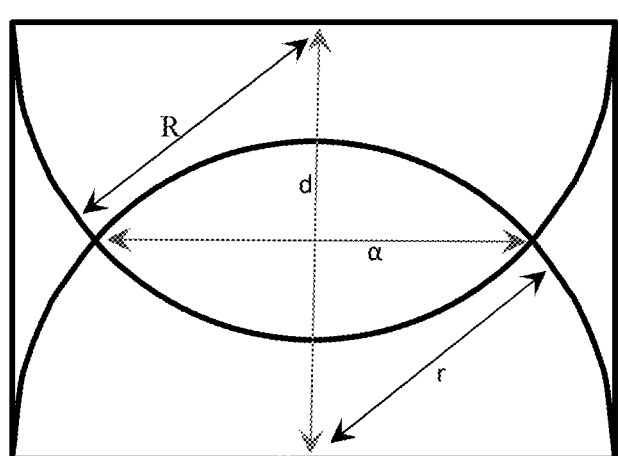
FIG. 15 shows results of an expansive prediction and photograph of a short narrow bentonite cylinder's expansion in a large diameter restraint. The overlap of the two spherical end expansion zones may be clearly seen as a central hole.
Figure 15:
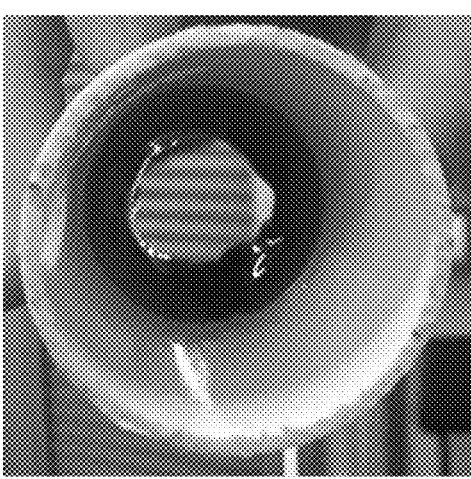
Figure 16:
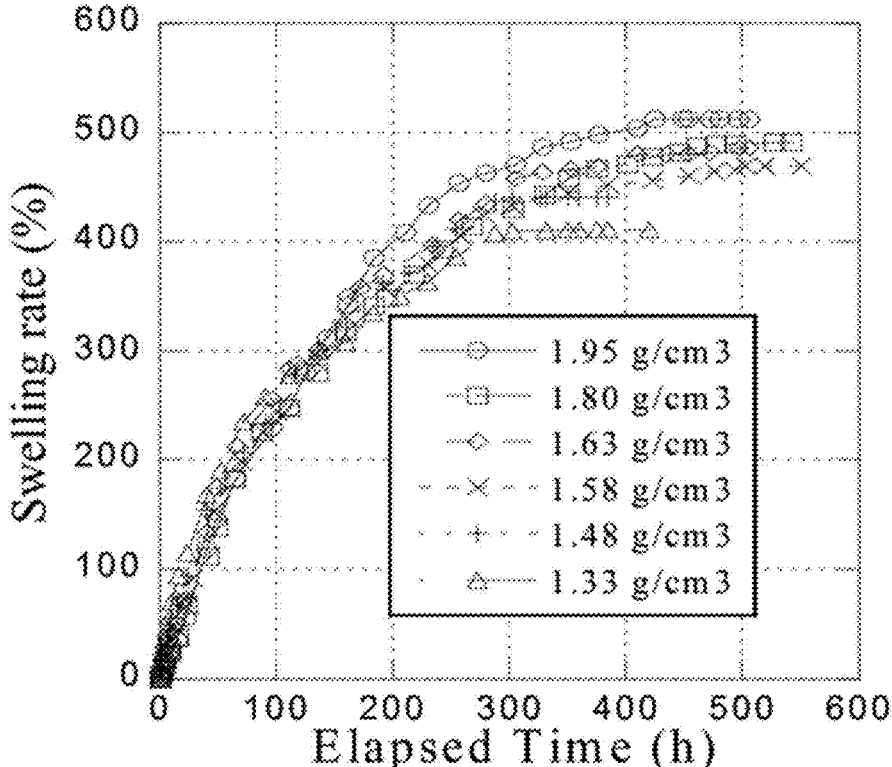
FIG. 16 shows the effect of the total number of plates within a sample (or density of a sample) on swelling rate characteristics of compacted bentonite.
Figure 17:
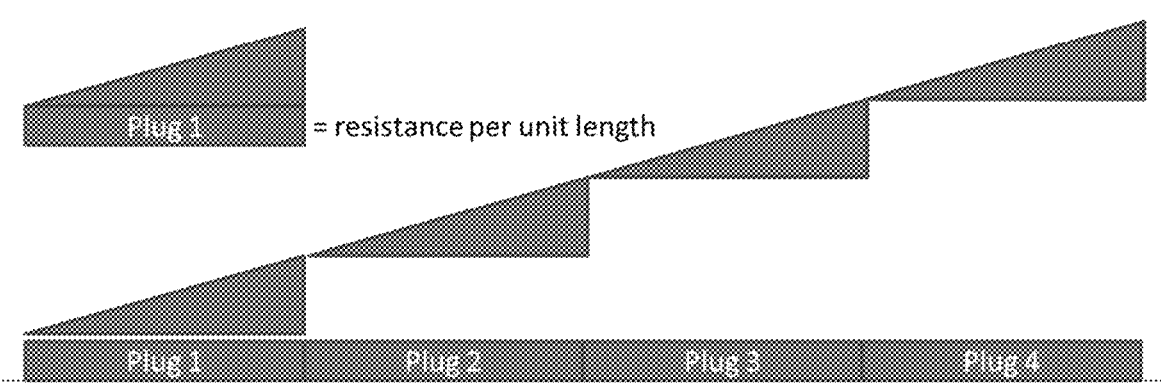
FIG. 17 shows an example of the sequential plug failure penetration pressure R for 4 plugs.
Figure 18:
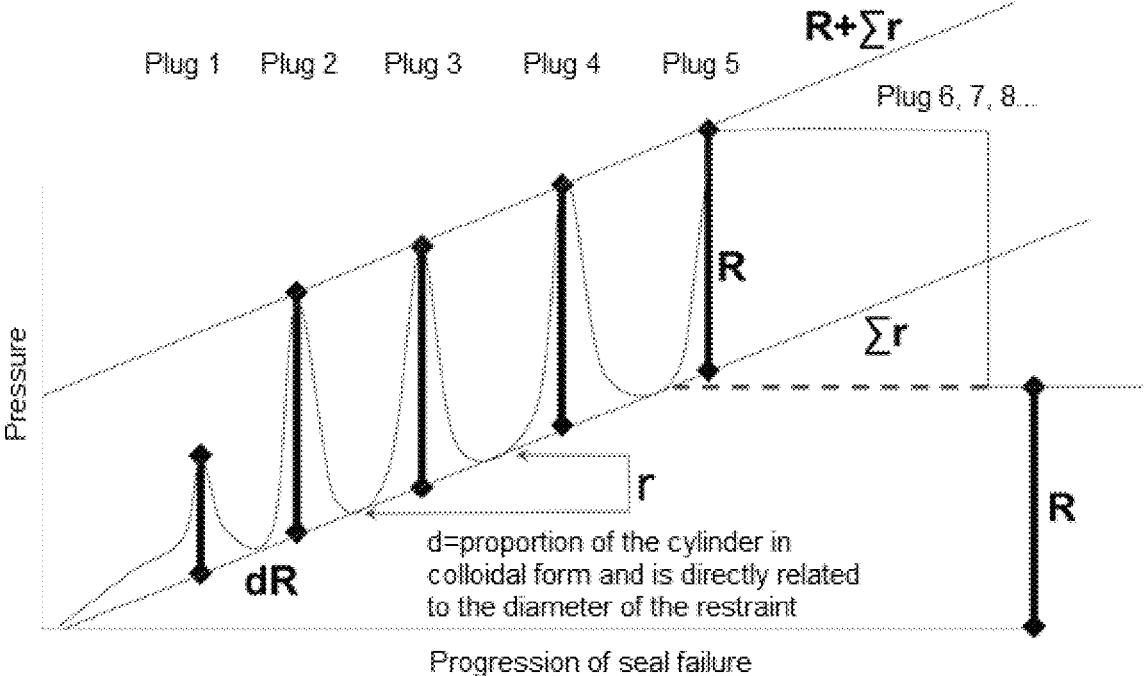
FIG. 18 shows the cumulative resistance Er to flow related to the length of the channel required for flow.
Figure 19:
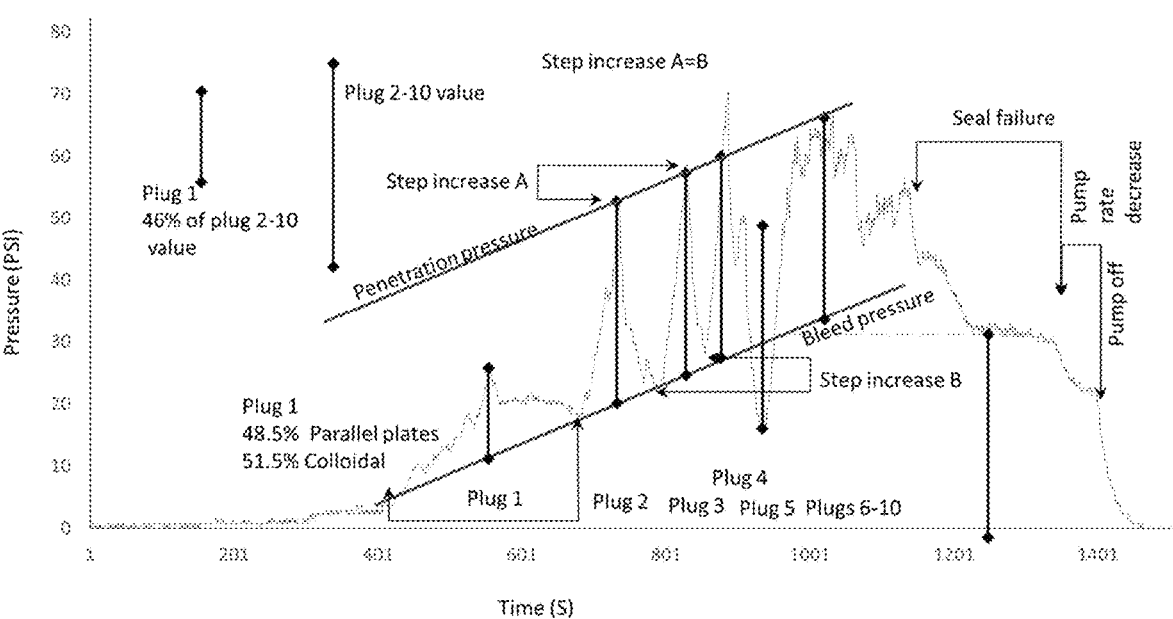
FIG. 19 shows an example of the empirical bleed failure of 10 sequential plugs of compressed bentonite cylinders.
Figure 20:
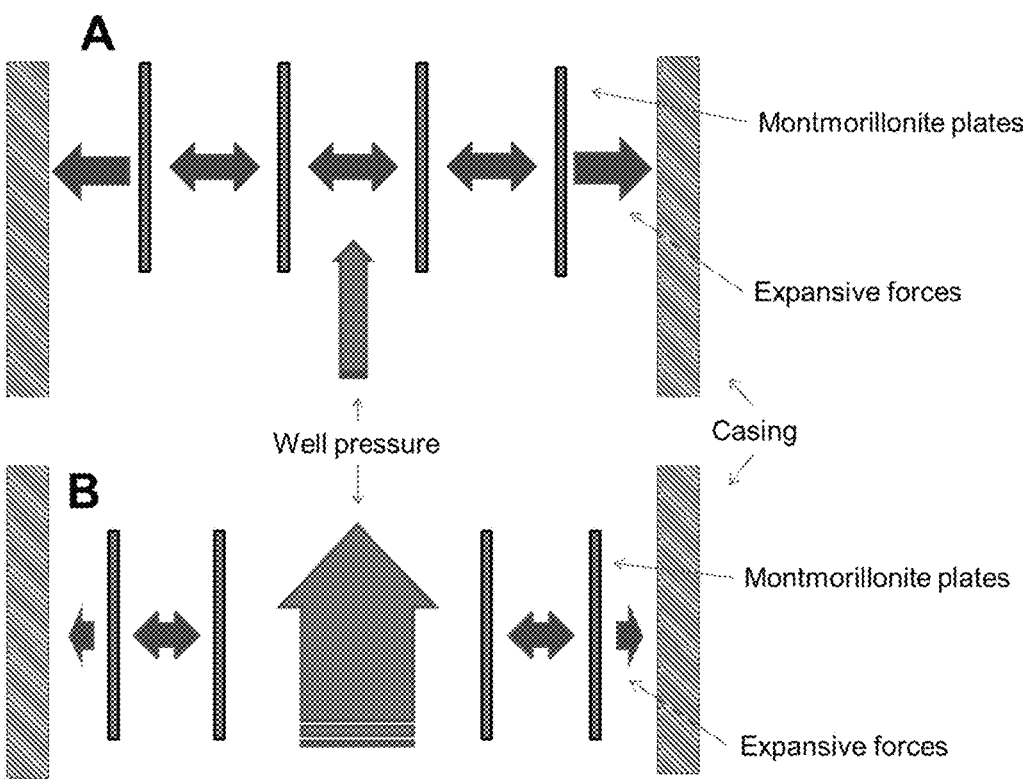
FIGS. 20A and 20B respectively show the dilation of the montmorillonite plates of an expanded bentonite cylinder before and after the applied pressure has reached a level sufficient to distort the distribution of the bentonite plates in a well.
Figure 21:
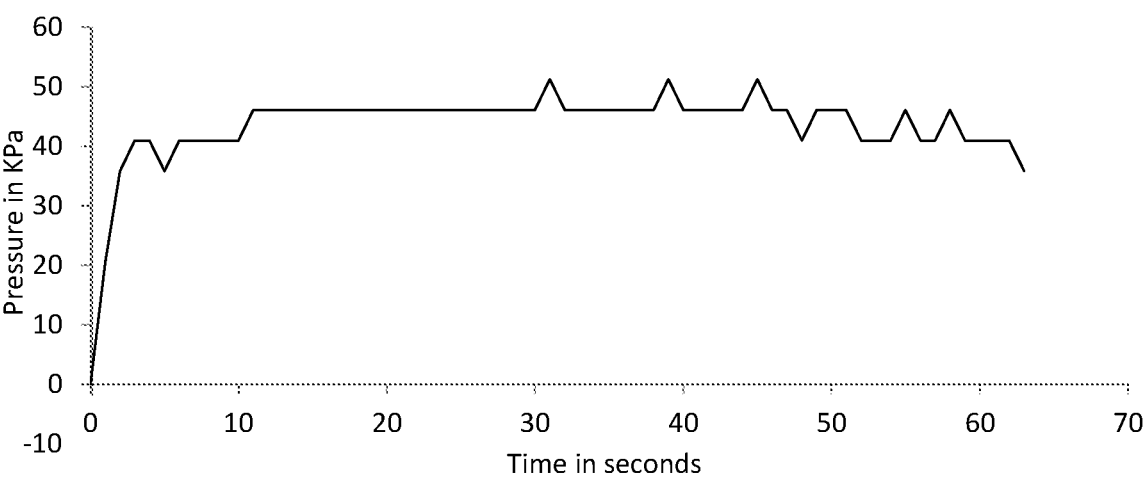
FIG. 21 shows the frictional slip failure pressure of a single 139.7 mm diameter×240 mm length compressed bentonite cylinder, which had been allowed to hydrate and expand in a 193.7 mm ID casing.
Figure 22:
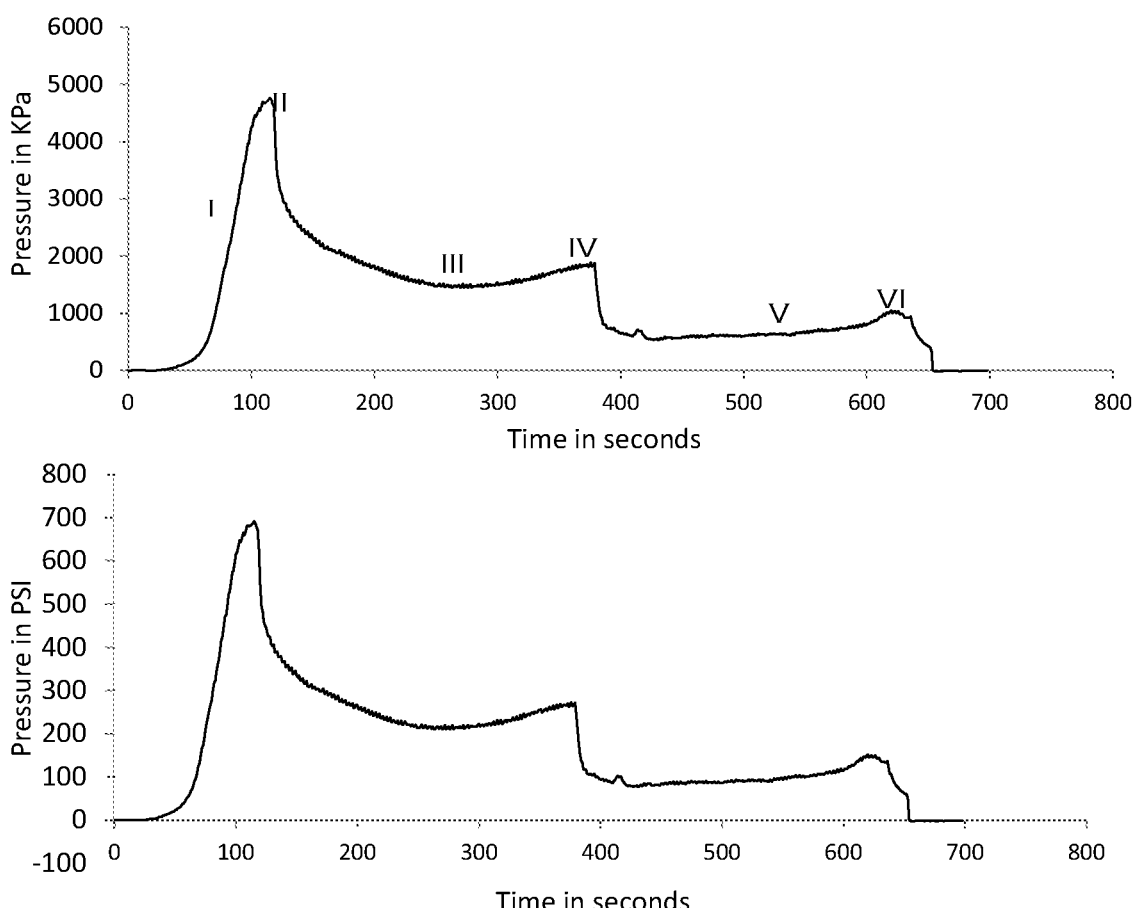
FIG. 22 shows the frictional failure dislodgment pressure (in both kPA or in PSI) of a grouted, single 139.7 mm diameter×240 mm length compressed bentonite cylinder which had been allowed to hydrate and expand in a 193.7 mm ID casing, over different stages being: (I) initial resistance to the applied pressure, (II) a sufficiently high pressure breaks adhesion of the plug grout at the casing wall, causing failure, (III) movement of the plug stops due to irregularities within the casing surface, which creates a frictional counterforce, followed by a second slip failure (IV) of the plug.
Figure 23:
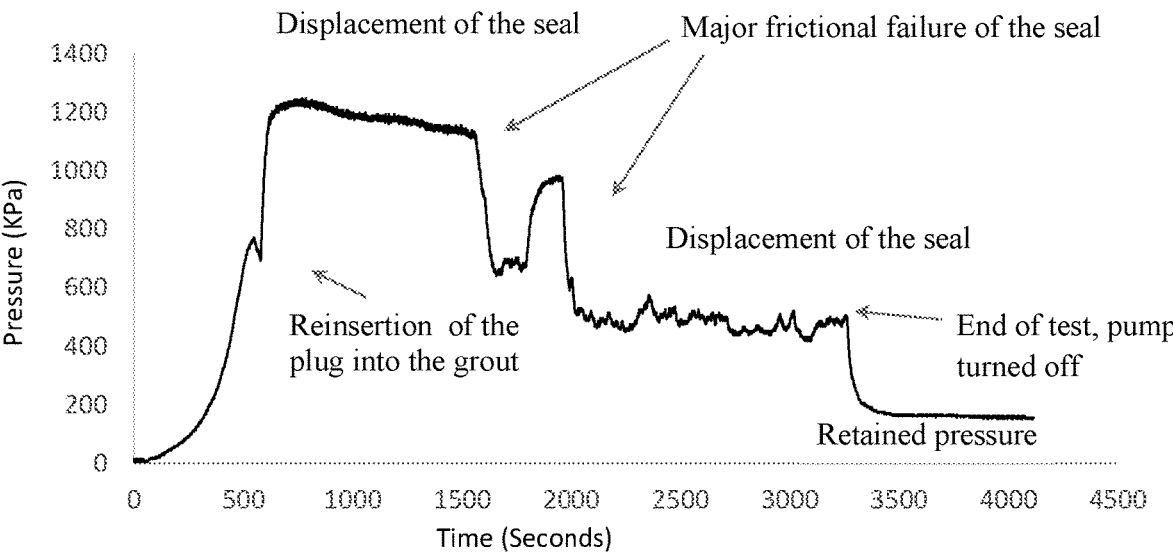
FIG. 23 shows the frictional failure pressure of the self-healed, grouted single 139.7 mm diameter×240 mm length compressed bentonite cylinder in a 193.7 mm ID casing as shown in FIG. 22.
Figure 24:
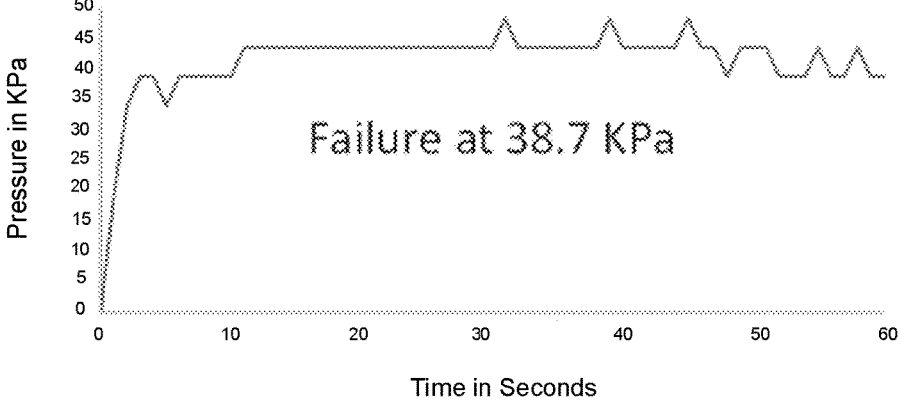
FIG. 24 shows the frictional slip failure pressure of a single 139.7 mm diameter×240 mm length compressed cylinder plug containing unmodified bentonite, which had been allowed to hydrate in potable water and expand in a 193.7 mm ID casing.
Figure 25:
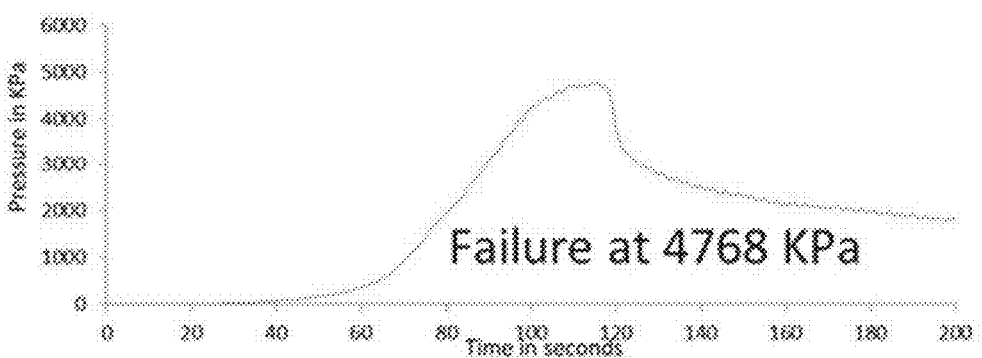
FIG. 25 shows the frictional slip failure pressure of a single 139.7 mm diameter×240 mm length compressed cylinder plug containing bentonite SCM in conjunction with a two-component cement grout mixture, which had been allowed to hydrate and expand in a 193.7 mm ID casing.
Figure 26:
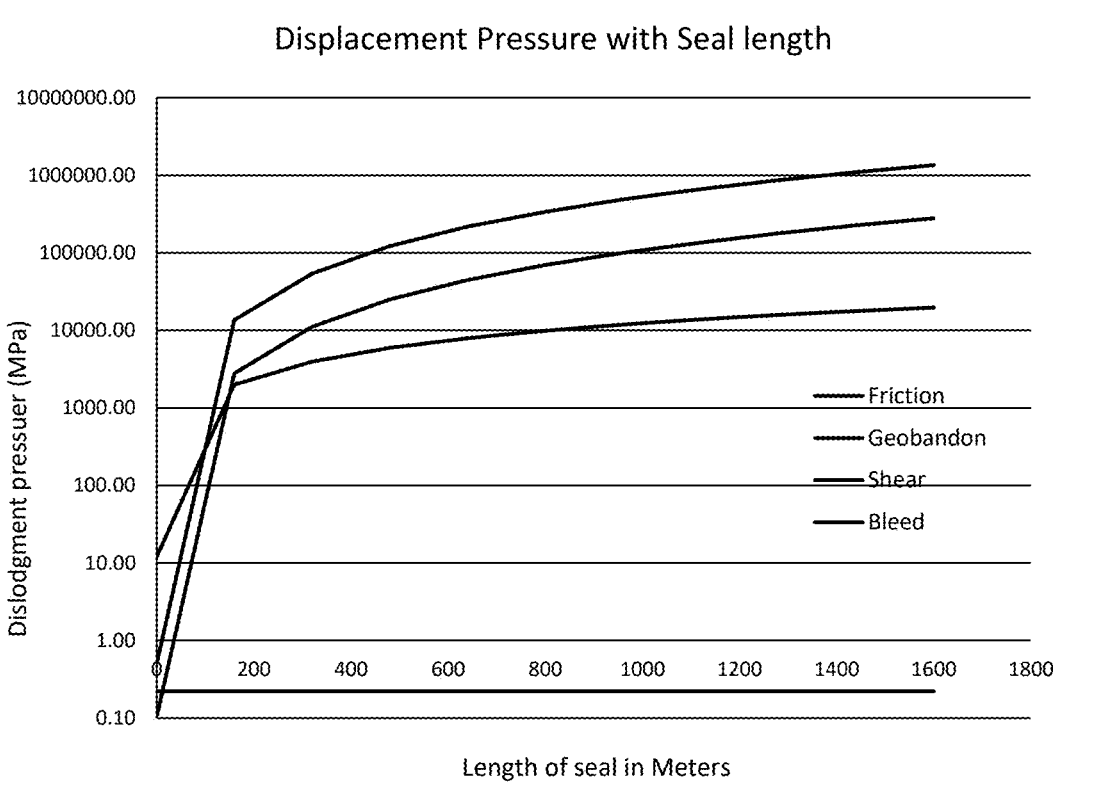
FIG. 26 shows the predicted effect of the length of a plug seal on the displacement or dislodgement pressure of the well plug, when comparing the three separate mechanisms of seal failure known to occur for bentonite against a seal made using a compressed plug comprising the hydratable combination cement grout disclosed in this specification, in conjunction with bentonite SCM.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The preceding description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope and spirit of the disclosed embodiments, the embodiments being illustrative and not restrictive.

Furthermore, the inventions have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realise yet other embodiments.

The invention claimed is:

1. A method of controlled hydration expansion of a smectite-containing clay mineral (SCM) within an aqueous environment in a confined volumetric space within an underground well bore, the method comprising the steps of:

introducing a positionable delivery body, which includes an amount of an SCM, and an amount of one or more introduced chemical substances, into said volumetric space via an inlet thereinto, the amount of said introduced chemical substances being arranged to react with one or more ionic materials found in solution in said aqueous environment to form a solid product, and to thereby cause a controlled reduction in ionic strength in said aqueous environment, wherein said controlled reduction in ionic strength in the aqueous environment in turn controls hydration expansion of said amount of the SCM into the aqueous environment by consequentially increasing a rate of release of particles of said SCM from the body, said hydration expansion being a movement of the SCM particles between a first condition of the SCM particles being in facing proximity to one another, and a second condition of the SCM particles being spatially separated from one another, and wherein movement from said first condition towards said second condition results in a change in pressure in the confined volumetric space; and introducing an aqueous flow path modification to limit movement of the SCM particles from the second condition to the first condition so as to maintain the change in pressure in said volumetric space resulting from movement of the SCM particles from the first condition to the second condition, wherein the one or more introduced chemical substances comprise either:

an amount of each member of the group comprising ordinary Portland cement (OPC) and calcium sulfoaluminate cement (CSA), or an amount of each of the compounds in each of Group A and Group B, comprising Group A alite or tricalcium silicate $(Ca_3O_5Si)$ $(C_3S)$; belite or dicalcium silicate $(Ca_2SiO_4)$ $(C_2S)$; tri-calcium aluminate $(3CaO\ Al_2O_3)$ $(C_3A)$; tetra-calcium aluminoferrite $(4CaO\ Al_2O_3\ Fe_2O_3)$ $(C_4AF)$;

Group B belite or dicalcium silicate $(Ca_2SiO_4)$ $(C_2S)$;

gypsum or calcium sulfate n-hydrate $(CaSO_4 \cdot n\text{-}H_2O)$;

tetra calcium trialuminate sulfate $(Ca_4(AlO_2)_6 SO_3)$.

2. The method as claimed in claim 1, wherein the step of hydration expansion movement of the SCM particles in the aqueous environment occurs simultaneously with the introduction of the positionable delivery body into the confined volumetric space.

3. The method as claimed in claim 1, wherein the step of introducing an aqueous flow path modification occurs simultaneously with the step of hydration expansion movement of the SCM particles in the aqueous environment.

4. The method as claimed in claim 1, wherein the solid product formed from the use of the or each introduced chemical substance forms a gel, in use which provides retention of said spatial separation of SCM particles in the second condition.

5. The method as claimed in claim 1, wherein the solid product is ettringite.

6. The method as claimed in claim 5, wherein the ettringite, which provides retention of said spatial separation of hydrated particles of SCM when moved into the second condition, is formed in situ in the aqueous environment by creating:

(i) a mixture of aluminate, sulfate, and calcium ions produced from the hydration of CSA cement;

which, in the presence of:

(ii) alkali (calcium hydroxide or $Ca(OH)_2$), produced from the hydration of dicalcium silicate $(Ca_2SiO_4)$ $(C_2S)$ which is present in OPC and in CSA cement, reacts to form ettiringite:

calcium trisulfoaluminate hydrate, $(3CaO \cdot Al_2O_3 \cdot 3CaSO_4 \cdot 32\ H_2O)$, which is expansive in nature.

7. The method as claimed in claim 6, wherein formation of ettringite ceases when all of the sulfate ions, and some of the calcium ions from the mixture of step (i) are consumed.

8. The method as claimed in claim 7, wherein when the already-formed ettringite subsequently becomes unstable, converting to calcium monosulfoaluminate hydrate (AFm phase) $(CaO \cdot Al_2O_3 \cdot CaSO_4 \cdot 12\ H_2O)$ or $C_3A \cdot CaSO_4 \cdot 12\ H_2O$, and eventually dissolution to calcium, sulfate and aluminate ions.

9. The method as claimed in claim 1, wherein, with the passage of time, the aqueous flow path modification which was initially introduced to limit movement of the SCM particles from the second condition to the first condition is replaced by a second aqueous flow path modification.

10. The method as claimed in claim 9, wherein the second aqueous flow path modification involves the use of one or more further introduced chemical substances to form further solid product gel, which provides retention of the spatial separation of SCM particles in the second condition.

11. The method as claimed in claim 10, wherein the further solid product gel is strätlingite.

12. The method as claimed in claim 11, wherein the strätlingite $(Ca_2Al_2(SiO_2)(OH)10 \cdot 2.5(H_2O))$, which provides retention of said spatial separation of hydrated particles of SCM when moved into the second condition, is formed in situ in the aqueous environment as follows:

(i) about 7-15 days after the hydration of the SCM commences, an increase occurs in the rate of hydration of dicalcium silicate $(Ca_2SiO_4)$ $(C_2S)$ which is present in both OPC and in CSA cement;

(ii) this results in the formation of an alkali (calcium hydroxide), $(Ca(OH)_2)$, and silicate ions in solution; and in addition is combined with (iii) a mixture of aluminate, sulfate, and calcium ions are produced from dissolution of the ettringite.

13. The method as claimed in claim 10, wherein the introduced chemical substance is an amount of each member of the group comprising: ordinary Portland cement (OPC); calcium sulfoaluminate cement (CSA).

14. The method as claimed in claim 13, wherein the amount of each member of the group comprising OPC and CSA is present in a combination of: which is comprised of between more than 10% w/w of CSA and less than 80% w/w of OPC and less than 70% w/w of CSA and more than 20% w/w of OPC;

and in each case, the balance of 10% w/w being made up of additional reactive ionic sulfates and cement setting agents used to adjust the rate of hydration expansion.

15. The method as claimed in claim 14, wherein the total weight of water compared to the total weight of all introduced chemical substances subjected to controlled hydration expansion by being mixed into the water is present in a ratio of between 3.5:1.0 and 2.0:1.0.

16. The method as claimed in claim 10, wherein the one or more introduced chemical substances comprise an amount of each of the compounds in each of Group A and Group B, comprising:

Group A alite or tricalcium silicate $(Ca_3O_5Si)$ $(C_3S)$; belite or dicalcium silicate $(Ca_2SiO_4)$ $(C_2S)$; tricalcium aluminate $(3CaO\ Al_2O_3)$ $(C_3A)$; tetra-calcium aluminoferrite $(4CaO\ Al_2O_3Fe_2O_3)$ $(C_4AF)$;

Group B belite or dicalcium silicate $(Ca_2SiO_4)$ $(C_2S)$; gypsum or calcium sulfate n-hydrate $(CaSO_4 \cdot n\text{-}H_2O)$; tetra calcium trialuminate sulfate $(Ca_4(AlO_2)_6SO_3)$.

17. The method as claimed in claim 16, wherein the total weight of water compared to the total weight of all introduced chemical substances subjected to controlled hydration expansion by being mixed into the water is present in a ratio of between 3.5:1.0 and 2.0:1.0.

18. The method as claimed in claim 1, wherein the SCM particles are plate-like in shape, a major face of each of the plate-like particles being arranged in facing proximity to a major face of another SCM particle, prior to hydration expansion.

19. The method as claimed in claim 18, wherein as the SCM particles within the confined volumetric space become hydrated, they move away from the positionable delivery body and towards a wall of the volumetric space, to form a zone of plate-like particles at the wall, unless limited from doing so by the aqueous flow path modification.

20. The method as claimed claim 1, wherein the step of controlling the hydration expansion in the aqueous environment involves the introduction of an aqueous flow path modification in the form of a physical barrier to limit movement of the SCM particles from the second condition to the first condition so as to maintain the change in pressure in said volumetric space due to hydration of the SCM particles.

21. The method as claimed in claim 1, wherein the positionable delivery body is in the form of a cylinder having an external circumferential diameter which is narrower than an internal diameter of the confined volumetric space within the well bore, and of the inlet thereto, and the method of controlled hydration expansion is preceded by the step of sliding the positionable delivery body through said inlet to a pre-determined location in said volumetric space.

22. The method as claimed in claim 21 wherein the positionable delivery body comprises a compressed core of SCM which experiences said controlled expansion until said compressed core is at least partially consumed to a point of equilibrium in its expansion, whereupon an unconsumed remainder of said core provides the basis for future controlled hydration expansion as required.

23. The method as claimed in claim 22, wherein the confined volumetric space is defined by the annular space between an interior cylindrical wall of the underground well bore and an external cylindrical surface of the compressed core.

24. The method as claimed in claim 1, wherein the amount of each member of the group comprising OPC and CSA is present in a combination of: which is comprised of between more than 10% w/w of CSA and less than 80% w/w of OPC and less than 70% w/w of CSA and more than 20% w/w of OPC;

and, in each case, the balance of 10% w/w being made up of additional reactive ionic sulfates and cement setting agents used to adjust the rate of hydration expansion.

25. The method as claimed in claim 1, wherein the total weight of water compared to the total weight of all introduced chemical substances subjected to controlled hydration expansion by being mixed into the water is present in a ratio of between 3.5:1.0 and 2.0:1.0.

26. The method as claimed in claim 1, wherein the change in pressure in the volumetric space is an increase in pressure associated with the expansion of the spatial separation of the SCM particles as the volumetric space becomes filled with water, or with SCM particles, or a combination of both.

* * * * *